US007103656B2

(12) United States Patent
Lewis et al.

(10) Patent No.: US 7,103,656 B2
(45) Date of Patent: Sep. 5, 2006

(54) SYSTEM AND METHOD FOR ADMINISTRATING A WIRELESS COMMUNICATION NETWORK

(75) Inventors: Allan D. Lewis, New Dundee (CA); Denny K. Chiu, Kitchener (CA)

(73) Assignee: Research In Motion Limited, Waterloo (CA)

(*) Notice: Subject to any disclaimer, the term of this patent is extended or adjusted under 35 U.S.C. 154(b) by 691 days.

(21) Appl. No.: 10/079,317

(22) Filed: Feb. 20, 2002

(65) Prior Publication Data

US 2002/0143866 A1    Oct. 3, 2002

Related U.S. Application Data

(60) Provisional application No. 60/270,097, filed on Feb. 20, 2001.

(51) Int. Cl.
*G06F 15/173* (2006.01)
*G06F 15/16* (2006.01)
*G06F 15/177* (2006.01)

(52) U.S. Cl. ............... 709/223; 709/220; 709/206; 709/229

(58) Field of Classification Search ............... 709/206, 709/223, 220, 229
See application file for complete search history.

(56) References Cited

U.S. PATENT DOCUMENTS

| 4,106,060 | A | 8/1978  | Chapman, Jr. |
| 4,417,349 | A | 11/1983 | Hills et al. |
| 4,438,433 | A | 3/1984  | Smoot et al. |
| 4,558,454 | A | 12/1985 | Hills et al. |
| 4,644,351 | A | 2/1987  | Zabarsky et al. |
| 4,695,880 | A | 9/1987  | Johnson et al. |
| 4,697,281 | A | 9/1987  | O'Sullivan |
| 4,713,780 | A | 12/1987 | Schultz et al. |
| 4,768,087 | A | 8/1988  | Taub et al. |
| 4,837,798 | A | 6/1989  | Cohen et al. |
| 4,837,800 | A | 6/1989  | Freeburg et al. |
| 4,845,658 | A | 7/1989  | Gifford |

(Continued)

FOREIGN PATENT DOCUMENTS

AU        7843498        2/1999

(Continued)

OTHER PUBLICATIONS

Motorola, "Air*Mobile*™ Wireless Comm Guide for cc:Mail" User Guide Version 1.0, Motorola Wireless Data Group, 1995, pp. 3-48.

(Continued)

*Primary Examiner*—Jason Cardone
*Assistant Examiner*—Tanim Hossain
(74) *Attorney, Agent, or Firm*—Jones Day; Krishna K. Pathiyal; Robert C. Liang

(57) ABSTRACT

The invention disclosed is an administration system and method for administering user access to an Enterprise system that supports redirection of data from a user's desktop computer in a Local Area Network to a user's wireless device. The Enterprise system having a plurality of message servers and one or more Enterprise servers, the Enterprise servers serving to direct data stored on the message servers between the user's desktop computer and the user's wireless device. The administration system having two components, a user interface (or client) and a administration service. The client having restricted access to what changes can be made to the data on the Enterprise server, yet sufficient permissions to require a single point of access to maintain user access to both the message server and the Enterprise servers.

19 Claims, 7 Drawing Sheets

U.S. PATENT DOCUMENTS

| | | |
|---|---|---|
| 4,856,047 A | 8/1989 | Saunders |
| 4,928,096 A | 5/1990 | Leonardo et al. |
| 4,951,044 A | 8/1990 | Nelson et al. |
| 4,972,457 A | 11/1990 | O'Sullivan |
| 4,980,907 A | 12/1990 | Raith et al. |
| 5,008,926 A | 4/1991 | Misholi |
| 5,043,721 A | 8/1991 | May |
| 5,068,916 A | 11/1991 | Harrison et al. |
| 5,086,502 A | 2/1992 | Malcolm |
| 5,125,021 A | 6/1992 | Lebowitz |
| 5,127,041 A | 6/1992 | O'Sullivan |
| 5,128,981 A | 7/1992 | Tsukamoto et al. |
| 5,136,291 A | 8/1992 | Teague |
| 5,157,660 A | 10/1992 | Kuwahara et al. |
| 5,159,592 A | 10/1992 | Perkins |
| 5,177,680 A | 1/1993 | Tsukino et al. |
| 5,181,200 A | 1/1993 | Harrison |
| 5,210,785 A | 5/1993 | Sato et al. |
| 5,265,033 A | 11/1993 | Vajk et al. |
| 5,283,887 A | 2/1994 | Zachery |
| 5,293,250 A | 3/1994 | Okumura et al. |
| 5,299,255 A | 3/1994 | Iwaki et al. |
| 5,307,059 A | 4/1994 | Connary et al. |
| 5,313,582 A | 5/1994 | Hendel et al. |
| 5,315,635 A | 5/1994 | Kane et al. |
| 5,333,152 A | 7/1994 | Wilber |
| 5,333,266 A | 7/1994 | Boaz et al. |
| 5,370,566 A | 12/1994 | Mitchell, Jr. et al. |
| 5,392,390 A | 2/1995 | Crozier |
| 5,406,557 A | 4/1995 | Baudoin |
| 5,410,543 A | 4/1995 | Seitz et al. |
| 5,416,473 A | 5/1995 | Dulaney, III et al. |
| 5,416,842 A | 5/1995 | Aziz |
| 5,436,960 A | 7/1995 | Campana, Jr. et al. |
| 5,438,611 A | 8/1995 | Campana, Jr. et al. |
| 5,452,356 A | 9/1995 | Albert |
| 5,479,472 A | 12/1995 | Campana, Jr. et al. |
| 5,487,100 A | 1/1996 | Kane |
| 5,493,692 A | 2/1996 | Theimer et al. |
| 5,495,484 A | 2/1996 | Self et al. |
| 5,548,789 A | 8/1996 | Nakanura |
| 5,557,659 A | 9/1996 | Hyde-Thomson |
| 5,559,800 A | 9/1996 | Mousseau et al. |
| 5,572,528 A | 11/1996 | Shuen |
| 5,579,472 A | 11/1996 | Keyworth, II et al. |
| 5,588,009 A | 12/1996 | Will |
| 5,598,536 A | 1/1997 | Slaughter, III et al. |
| 5,603,054 A | 2/1997 | Theimer et al. |
| 5,604,491 A | 2/1997 | Coonley et al. |
| 5,604,788 A | 2/1997 | Tett |
| 5,613,108 A | 3/1997 | Morikawa |
| 5,625,670 A | 4/1997 | Campana, Jr. et al. |
| 5,627,829 A | 5/1997 | Gleeson et al. |
| 5,630,060 A | 5/1997 | Tang et al. |
| 5,631,946 A | 5/1997 | Campana, Jr. et al. |
| 5,633,810 A | 5/1997 | Mandal et al. |
| 5,638,450 A | 6/1997 | Robson |
| 5,666,530 A | 9/1997 | Clark et al. |
| 5,666,553 A | 9/1997 | Crozier |
| 5,673,322 A | 9/1997 | Pepe et al. |
| 5,701,423 A | 12/1997 | Crozier |
| 5,705,995 A | 1/1998 | Laflin et al. |
| 5,706,211 A | 1/1998 | Beletic et al. |
| 5,727,202 A | 3/1998 | Kucala |
| 5,729,735 A | 3/1998 | Meyering |
| 5,737,531 A | 4/1998 | Ehley |
| 5,742,905 A | 4/1998 | Pepe et al. |
| 5,745,689 A | 4/1998 | Yeager et al. |
| 5,751,960 A | 5/1998 | Matsunaga |
| 5,751,971 A | 5/1998 | Dobbins et al. |
| 5,754,954 A | 5/1998 | Cannon et al. |
| 5,757,901 A | 5/1998 | Hiroshige |
| 5,758,088 A | 5/1998 | Bezaire et al. |
| 5,758,150 A | 5/1998 | Bell et al. |
| 5,761,416 A | 6/1998 | Mandal et al. |
| 5,764,639 A | 6/1998 | Staples et al. |
| 5,764,899 A | 6/1998 | Eggleston et al. |
| 5,765,170 A | 6/1998 | Morikawa |
| 5,771,353 A | 6/1998 | Eggleston et al. |
| 5,781,614 A | 7/1998 | Brunson |
| 5,781,901 A | 7/1998 | Kuzma |
| 5,790,790 A | 8/1998 | Smith et al. |
| 5,790,974 A | 8/1998 | Tognazzini |
| 5,796,806 A | 8/1998 | Birckbichler |
| 5,812,671 A | 9/1998 | Ross, Jr. |
| 5,812,773 A | 9/1998 | Norin |
| 5,812,819 A | 9/1998 | Rodwin et al. |
| 5,813,016 A | 9/1998 | Sumimoto |
| 5,815,081 A | 9/1998 | Motohashi |
| 5,819,172 A | 10/1998 | Campana, Jr. et al. |
| 5,819,284 A | 10/1998 | Farber et al. |
| 5,822,434 A | 10/1998 | Caronni et al. |
| 5,826,062 A | 10/1998 | Fake, Jr. et al. |
| 5,838,252 A | 11/1998 | Kikinis |
| 5,838,926 A | 11/1998 | Yamagishi |
| 5,844,969 A | 12/1998 | Goldman et al. |
| 5,850,219 A | 12/1998 | Kumomura |
| 5,850,444 A | 12/1998 | Rune |
| 5,862,321 A | 1/1999 | Lamming et al. |
| 5,867,660 A | 2/1999 | Schmidt et al. |
| 5,878,434 A | 3/1999 | Draper et al. |
| 5,881,235 A | 3/1999 | Mills |
| 5,889,845 A | 3/1999 | Staples et al. |
| 5,903,723 A | 5/1999 | Beck et al. |
| 5,905,777 A | 5/1999 | Foladare et al. |
| 5,917,629 A | 6/1999 | Hortensius et al. |
| 5,928,329 A | 7/1999 | Clark et al. |
| 5,937,161 A | 8/1999 | Mulligan et al. |
| 5,941,954 A | 8/1999 | Kalajan |
| 5,941,956 A | 8/1999 | Shirakihara et al. |
| 5,943,426 A | 8/1999 | Frith et al. |
| 5,948,066 A | 9/1999 | Whalen et al. |
| 5,951,636 A | 9/1999 | Zerber |
| 5,953,322 A | 9/1999 | Kimball |
| 5,958,006 A | 9/1999 | Eggleston et al. |
| 5,961,590 A | 10/1999 | Mendez et al. |
| 5,964,833 A | 10/1999 | Kikinis |
| 5,966,663 A | 10/1999 | Gleason |
| 5,968,131 A | 10/1999 | Mendez et al. |
| 5,969,636 A | 10/1999 | Parvulescu et al. |
| 5,973,612 A | 10/1999 | Deo et al. |
| 5,974,180 A | 10/1999 | Schwendeman |
| 5,974,238 A | 10/1999 | Chase, Jr. |
| 5,978,689 A | 11/1999 | Tuoriniemi et al. |
| 5,978,837 A | 11/1999 | Foladare et al. |
| 5,983,073 A | 11/1999 | Ditzik |
| 5,987,508 A | 11/1999 | Agraharam et al. |
| 5,995,597 A | 11/1999 | Woltz et al. |
| 6,000,000 A | 12/1999 | Hawkins et al. |
| 6,006,274 A | 12/1999 | Hawkins et al. |
| 6,009,173 A | 12/1999 | Sumner |
| 6,014,429 A | 1/2000 | LaPorta et al. |
| 6,018,762 A | 1/2000 | Brunson et al. |
| 6,023,700 A | 2/2000 | Owens et al. |
| 6,023,708 A | 2/2000 | Mendez et al. |
| 6,034,621 A | 3/2000 | Kaufman |
| 6,035,104 A | 3/2000 | Zahariev |
| 6,052,442 A | 4/2000 | Cooper et al. |
| 6,052,563 A | 4/2000 | Macko |
| 6,052,735 A | 4/2000 | Ulrich et al. |
| 6,058,431 A | 5/2000 | Srisuresh et al. |
| 6,067,561 A | 5/2000 | Dillon |
| 6,072,862 A | 6/2000 | Srinivasan |
| 6,073,137 A | 6/2000 | Brown et al. |

| | | |
|---|---|---|
| 6,073,165 A | 6/2000 | Narasimhan et al. |
| 6,078,826 A | 6/2000 | Croft et al. |
| 6,084,969 A | 7/2000 | Wright et al. |
| 6,085,192 A | 7/2000 | Mendez et al. |
| 6,085,231 A | 7/2000 | Agraharam et al. |
| 6,085,232 A | 7/2000 | Kikinis |
| 6,091,951 A | 7/2000 | Sturniolo et al. |
| 6,092,114 A | 7/2000 | Shaffer et al. |
| 6,092,191 A | 7/2000 | Shimbo et al. |
| 6,101,531 A | 8/2000 | Eggleston et al. |
| 6,112,244 A | 8/2000 | Moore et al. |
| 6,115,394 A | 9/2000 | Balachandran et al. |
| 6,115,736 A | 9/2000 | Devarakonda et al. |
| 6,119,167 A | 9/2000 | Boyle et al. |
| 6,125,281 A | 9/2000 | Wells et al. |
| 6,125,369 A | 9/2000 | Wu et al. |
| 6,128,739 A | 10/2000 | Fleming, III |
| 6,130,892 A | 10/2000 | Short et al. |
| 6,131,096 A | 10/2000 | Ng et al. |
| 6,131,116 A | 10/2000 | Riggins et al. |
| 6,134,432 A * | 10/2000 | Holmes et al. .......... 455/412.1 |
| 6,138,146 A | 10/2000 | Moon et al. |
| 6,141,690 A | 10/2000 | Weiman |
| 6,144,671 A | 11/2000 | Perinpanathan et al. |
| 6,144,997 A | 11/2000 | Lamming et al. |
| 6,151,606 A | 11/2000 | Mendez |
| 6,154,839 A | 11/2000 | Arrow et al. |
| 6,157,318 A | 12/2000 | Minata |
| 6,157,630 A | 12/2000 | Adler et al. |
| 6,157,950 A | 12/2000 | Krishnan |
| 6,163,274 A | 12/2000 | Lindgren |
| 6,167,379 A | 12/2000 | Dean et al. |
| 6,170,057 B1 | 1/2001 | Inoue et al. |
| 6,178,331 B1 | 1/2001 | Holmes et al. |
| 6,185,603 B1 | 2/2001 | Henderson et al. |
| 6,219,694 B1 | 4/2001 | Lazaridis et al. |
| 6,233,341 B1 | 5/2001 | Riggins |
| 6,240,088 B1 | 5/2001 | Gayton et al. |
| 6,249,820 B1 | 6/2001 | Dobbins et al. |
| 6,256,666 B1 | 7/2001 | Singhal |
| 6,272,545 B1 | 8/2001 | Flanagin et al. |
| 6,275,848 B1 | 8/2001 | Arnold |
| 6,275,850 B1 | 8/2001 | Beyda et al. |
| 6,289,212 B1 | 9/2001 | Stein et al. |
| 6,292,668 B1 | 9/2001 | Alanara et al. |
| 6,311,282 B1 | 10/2001 | Nelson et al. |
| 6,314,108 B1 | 11/2001 | Ramasubramani et al. |
| 6,314,519 B1 | 11/2001 | Davis et al. |
| 6,324,544 B1 | 11/2001 | Alam et al. |
| 6,324,587 B1 | 11/2001 | Trenbeath et al. |
| 6,330,244 B1 | 12/2001 | Swartz et al. |
| 6,333,973 B1 | 12/2001 | Smith et al. |
| 6,356,956 B1 | 3/2002 | Deo et al. |
| 6,360,272 B1 | 3/2002 | Lincke et al. |
| 6,389,455 B1 | 5/2002 | Fuisz |
| 6,389,457 B1 | 5/2002 | Lazaridis et al. |
| 6,400,958 B1 | 6/2002 | Isomursu et al. |
| 6,401,113 B1 | 6/2002 | Lazaridis et al. |
| 6,438,585 B1 | 8/2002 | Mousseau et al. |
| 6,449,287 B1 | 9/2002 | Leuca et al. |
| 6,463,463 B1 | 10/2002 | Godfrey et al. |
| 6,463,464 B1 | 10/2002 | Lazaridis et al. |
| 6,470,358 B1 | 10/2002 | Beyda et al. |
| 6,487,560 B1 | 11/2002 | LaRue et al. |
| 6,650,890 B1 * | 11/2003 | Irlam et al. ............... 455/412.1 |
| 6,701,378 B1 | 3/2004 | Gilhuly et al. |
| 2001/0001552 A1 | 5/2001 | Vong et al. |
| 2001/0015977 A1 | 8/2001 | Johansson |
| 2001/0029531 A1 | 10/2001 | Ohta |
| 2001/0040693 A1 | 11/2001 | Saito et al. |
| 2001/0042093 A1 | 11/2001 | Shirai et al. |
| 2001/0045885 A1 | 11/2001 | Tett |
| 2001/0054072 A1 | 12/2001 | Discolo et al. |
| 2002/0059380 A1 | 5/2002 | Biliris et al. |
| 2002/0099634 A1 * | 7/2002 | Coutts et al. ................ 705/35 |
| 2002/0120697 A1 * | 8/2002 | Generous et al. ........... 709/206 |

FOREIGN PATENT DOCUMENTS

| | | |
|---|---|---|
| DE | 19961345 | 12/1999 |
| EP | 0617373 | 9/1994 |
| EP | 0736989 | 10/1996 |
| EP | 0772327 A2 | 5/1997 |
| EP | 0777394 | 6/1997 |
| EP | 0788287 | 8/1997 |
| EP | 0793387 A2 | 9/1997 |
| EP | 0793387 A3 | 12/1997 |
| EP | 0825788 | 2/1998 |
| EP | 0838774 | 4/1998 |
| EP | 0838934 | 4/1998 |
| EP | 0772327 A3 | 2/1999 |
| EP | 0918417 | 5/1999 |
| EP | 0930766 | 7/1999 |
| EP | 0986225 | 3/2000 |
| EP | 1 096 725 A2 | 5/2001 |
| JP | 9305155 | 1/1997 |
| JP | 11289346 | 10/1999 |
| WO | 9619064 | 6/1996 |
| WO | 9726709 | 7/1997 |
| WO | 9727717 | 7/1997 |
| WO | 9732251 | 9/1997 |
| WO | 9733421 | 9/1997 |
| WO | 9741654 | 11/1997 |
| WO | 9744942 | 11/1997 |
| WO | WO 97/49251 | 12/1997 |
| WO | 9800787 | 1/1998 |
| WO | 9821911 | 5/1998 |
| WO | 9823108 | 5/1998 |
| WO | 9826344 | 6/1998 |
| WO | 9848560 | 10/1998 |
| WO | 9905620 | 2/1999 |
| WO | 9905813 | 2/1999 |
| WO | 9906900 | 2/1999 |
| WO | 9912365 | 3/1999 |
| WO | 9917505 | 4/1999 |
| WO | 9919988 A2 | 4/1999 |
| WO | 9919988 A3 | 4/1999 |
| WO | 9936870 | 7/1999 |
| WO | 9945484 | 9/1999 |
| WO | 9945684 | 9/1999 |
| WO | 9948312 | 9/1999 |
| WO | 9950974 | 10/1999 |
| WO | 9963709 | 12/1999 |
| WO | 0011567 | 3/2000 |
| WO | 0011832 | 3/2000 |
| WO | 0020994 | 4/2000 |
| WO | WO 00/31931 | 6/2000 |
| WO | WO 00/41359 | 7/2000 |
| WO | 0113572 | 2/2001 |
| WO | 0113656 | 2/2001 |
| WO | WO 01/22669 A1 | 3/2001 |
| WO | 0141472 | 6/2001 |
| WO | 0167716 | 9/2001 |
| WO | 0171539 | 9/2001 |

OTHER PUBLICATIONS

Motorola, "AirMobile™ Wireless Comm Server for cc:Mail" User Guide Version 1.1, Motorola Wireless Data Group, 1995, pp. 4-46.

Sun Microsystems, JavaMail API Design Specification, Version 1.0, Dec. 9, 1997, Sun Microsystems, Inc., chapters 1-10 appendices A-E.

Compaq, Aero 2100 Series Color Palm-size PC Reference Guide, Second Edition, Aug. 1999, Compaq Corporation.

Takahashi, Y. et al.: "Communication Method with Data Compression and Encryption for Mobile Computing Environment," Proceedings of INET96, Montreal, Canada, Jun. 24-28, 1996, Transforming Our Society Now, 11 pages.

United States District Court, Northern District of California, San Francisco Division: *Good Technology, Inc.* v. *Research In Motion, Ltd., et al.*, Case No. C02-2348 MJJ, Plaintiff Good Technology, Inc.'s Preliminary Invalidity Contentions Pursuant to Patent L.R. 3-3 and Response Under Patent L.R. 3-4, Jan. 16, 2004, 33 pages.

Perkins, C.: "RFC 2002—IP Mobility Support," IBM, Oct. 1996, 61 pages.

Johnson, D.: "Scalable Support for Transparent Mobile Host Internetworking," Wireless Networks, The Journal of Mobile Communication, Computation and Information, vol. 1, No. 3, Oct. 1995, pp. 311-321.

Dawson, F., et al.: "iCalender Message-Based Interoperability Protocol (iMIP)," Standards Track, RFC 2447, iMIP, Nov. 1998, 4 pages, XP-002249002.

Nelson, M.: "Wireless Data Services: Here and Now," PDA Developers 2.6, Nov./Dec. 1994, 3 pages.

Feibus, "A Desktop In Your Palm", Informationweek, Aug. 25, 1997, pp. 65ff.

Behr, "Handheld Solutions", Informationweek, Oct. 27, 1997, pp. 106-113.

Moody's Investors Service, Socket Communications Inc.—History & Debt, Investex Report No. 3240276.

Newsletter, E-Mail Merges With Voice Through Infinite Technologies, Voice Technology & Services News, May 26, 1998.

Newsletter, VODAPAGE: Vodapage demos increasing convergence of pagers and mobile communications at TMA 29, M2 Presswire Nov. 28, 1996.

Mosher, Microsoft Exchange User's Handbook, Duke Press, 1997, pp. 547-549.

Copy of DTS Wireless Website located at D.R.L. http://www.dtswireless.com.

"3Com PalmPilot Gets Wireless Link for E-Mail", Spooner, John G., PC Week, Dec. 8, 1997.

"Have Your Pager Call My Pager", Sullivan, Kristina B., PC Week, Dec. 8, 1997.

Briere, Daniel, et al., "One Mailbox, Just Like Old Times," Network World, vol. 14, issue 16, p. 21 (Apr. 21, 1997).

Padwick, et al., Special Edition Using Microsoft Outlook 97, 1997, Que Corporation, pp. 250-251, 353-367.

News Release, "Motorola Rings in 1995 with the Launch of the Macro® Wireless Communicator," Jan. 4, 1995 (4 pgs.).

Timeline, "FLEX™ Technology Timeline," (3 pgs.).

General Magic, Inc., Corporate Backgrounder, 2001 (2 pgs.).

Pegasus Email Settings, ABSnet Internet Services, Inc. (4 pgs.).

Motorola, Inc., emailVClient, 2001 (4 pages).

News Release, "Motorola Announces Pagewriter 250, The World's Smallest Pager with Full Keyboard", Feb. 27, 1997 (2 pgs.).

Dewey, Barney, "Communications Strategies for Newton 2.0," Newton Technology Journal, p. 10, Jun. 1996.

Press Release, "Motorola Announces New Solutions to Provide Consumers with Wireless Access to Personal and Enterprise E-mail Accounts," Mar. 21, 2001 (4 pgs.).

"Motorola's 'Marco' Wireless Communicator," http://www.msu.edu/-luckie/gallery/marco.htm, Jun. 14, 2001 (3 pgs.).

News Release, "CE Software Announces MobileVision," Editorial Contacts, CE Software, Inc., 1995 (3 pgs.).

News Release, "CE Software Ships MobileVision," Jun. 20, 1995 (3 pgs.).

Newton Reference, Communications, 1996-1997(4 pgs.).

PC Pro Issue 31: Realworld Computing, PDA Column, Jul. 30, 1997 (7 pgs.).

Enterprise Solutions for Email Overload, Founder Publications, http://www.amikanow.com/corporte/publications.htm, Aug. 6, 2001 (9 pgs.).

"Motorola's 'Marco' Wireless Communicator," http://www.msu.edu/-luckie/gallery/marco.htm, Aug. 6, 2001 (2 pgs.).

Press Release "Apple Agrees to License Newton Technology to Schlumberger, Digital Ocean," Nov. 3, 1995 (3 pgs.).

Frezza, Bill, "PDA, PDA, Wherefore Art Thou, PDA?", Freewire, Aug. 6, 2001 (6 pgs.).

Black, Lauren, et al., "Personal Digital Assistants," Macworld Reviews, Aug. 6, 2001 (5 pgs.).

Reference, "MobileVision Direct Wireless Connection to Your LAN-Based Electronic Mailbox," CE Software, Inc., pp. 1, 3, 5, 7, 9, 11, 13, 15, 17, 19, 21, 1995.

User Manual, "MobileVision Direct Wireless Connection to Your LAN-Based Electronic Mailbox," CE Software, Inc. 1995.

Johnson, David B., "Ubiquitous Mobile Host Internetworking," Fourth Workshop on Workstation Operating Systems, pp. 85-90, Oct. 14-15, 1993.

Johnson, David B., "Mobile Host Internetworking Using IP Loose Source Routing," School of Computer Science, Carnegie Mellon University, pp. 1-14 Feb. 1993.

Schoettle, Bob, "IP-Address Management on LANs," Byte, pp. 199-200, Feb. 1996.

Cheshire, Stuart, et al., "Internet Mobility 4 × 4," Computer Science Department, Stanford University, pp. 1-12, Aug. 1996.

Yeom, Hoen Y., "IP Multiplexing by Transparent Port-Address Translator," Proceedings of the Tenth USENIX System Administration Conference, pp. 113-122, Sep. 29-Oct. 4, 1996.

Johnson, David B., "Scalable and Robust Internetwork Routing for Mobile Hosts," IEEE Computer Society, pp. 2-11, 1994.

Egevang, K. et al., "The IP Network Address Translator," Network Working Group, pp. 1-10, May 1994.

Manual, "Server and BBS Software for the Packet Radio" by Jean Paul Roubelat, pp. 1-173.

Book, "Internetwork Mobility The CDPD Approach," by Mark S. Taylor, William Waung, and Mohsen Banan, Jun. 11, 1996.

"BlackBerry Technical White Paper," Research In Motion Ltd., Version 1.0, 1998-1999.

Newsletter, "Battery Friendly Bulletin," vol. 1, Issue 3, pp. 1-7 and unnumbered page, 1999.

Article, Comerford, "Handhelds Duke It Out for the Internet," Wireless Internet, pp. 35-38 and 41, Aug. 2000.

Press Detail, "Extended Systems and Motorola Bring Short-Range Wireless to the Paging E-volution," Jan. 13, 2000 (3 pgs.).

Press Detail, "3Com Corporation Licenses Bluetooth Technology from Extended Systems," Feb. 22, 2000 (2 pgs.).

Web site Article, Hawaleshka, "The Web in Your Pocket," Maclean's, May 15, 2000 (3 pgs.).

Claxton, "Messaging API's for Voice Networks, " Telecommunications, pp. 116-120, 1998.

Gifford, David K., et al., "The Application of Digital Broadcast Communication to Large Scale Information Systems," IEEE Journal on Selected Areas in Communications, vol. SAC-3, No. 3, pp. 457-467 (May 1985).

Gifford, David K., et al., "An Architecture for Large Scale Information Systems," ACM, pp. 161-170(1985).

Arnum, Eric, "The Universal Mailbox Arrives . . . Sort Of," Business Communications Review, pp. 49-52 (May 1996).

"Wireless E-Mail Services Gain Windows Clients," Kramer, Matt, PC Week, Apr. 17, 1995.

Perkins, C. et al., "IMHP: A Mobile Host Protocol For The Internet," Computer Networks And ISDN Systems 27 (1994), pp. 479-491.

Inouye, Jon et al., "System Support for Mobile Multimedia Applications," Proceedings of the IEEE 7th International Workshop on Network And Operating System Support For Digital Audio and Video, May 19-21, 1997, pp. 135-146.

Xu, Kevin Houzhi, "Reliable Stream Transmission Protocols In Mobile Computing Environments," Bell Labs Technical Journal, Summer 1997, pp. 152-163.

Lavana, Hemang et al.., "Internet-Based Workflows: A Paradigm For Dynamically Reconfigurable Desktop Environments," Confernece on Supporting Group Work, Proceedings of the International ACM SIGGROUP Conference on Supporting Group Work: The Integration Challenge, Nov. 16-19, 1997, pp. 204-213.

Perkins, Charles E. et al., "Mobility Support In IPv6," International Conference on Mobile Computing and Networking, Proceedings of the Second Annual International Conference on Mobile Computing and Networking, Nov. 11-12, 1996, pp. 27-37.

Goldszmidt, German et al., "*ShockAbsorber*: A TCP Connection Router," Globecom 97, IEEE Global Telecommunications Conference, Nov. 3-8, 1997, pp. 1919-1923.

SAM Reference Manual, System for Automated Messages (Sep. 1989).

IBM Portable Terminal User's Guide, Third Edition (Jun. 1985).

Binder, Richard et al, The Alohanet Menehune, University of Hawaii, Version II (Sep. 1974).

Computer Structures—Principles and Examples, McGraw Hill (1982).

Krebs, Jay, Portable Computer and Host Talk Over Radio-Frequency Link, Electronic, pp. 142-145 (Aug. 25, 1983).

Gadol, Steve, et al. "Nomadic Tenets- A User's Perspective," Sun Microsystems Laboratories, Inc., pp. 1-16 (Jun. 1994).

Declaration of David A. Keeney regarding SAM System, pp. 1-33 (Sep. 3, 2002).

"SAM™ integrates E-mail, Alpha Paging, Fax, and more!", SAM System for Automated Messages (10 pgs.).

SAMpage Manual, version 2.0, TeckNow! (Feb. 1990).

Reiter, Alan A., "Focus on Technology," Telocator (Jan. 1990) (4 pgs.).

Kuehn, Carl, "More than EMail," Southwest Computer & Business Equipment Review, vol. VII, No. 2, (Feb. 1990) (1 pg.).

SAM System for Automated Messages User's Manual (1988) (17 pgs.).

Motorola Operating Instructions for Your "PMR 2000" Series Display Radio Pagers Personal Message Center (2000) (7 pgs.).

Motorola PMR 2000 Personal Message Receiver POCSAG (CCIR Radio Paging Code #1) (1986) (6 pgs.).

Undated, Information Display Pager D40, NEC Corporation (6 pgs.).

* cited by examiner

SYSTEM AND METHOD FOR ADMINISTRATING A WIRELESS COMMUNICATION NETWORK

CROSS-REFERENCE TO RELATED APPLICATION

This application claims priority from U.S. Provisional Application Ser. No. 60/270,097, filed on Feb. 20, 2001. The complete disclosure of this provisional application, including drawings and claims, is hereby incorporated into this application by reference.

FIELD OF THE INVENTION

The present invention is directed toward the field of wireless communications in general, and in particular to administrating a wireless communication system.

BACKGROUND OF THE INVENTION

In a typical wireless computer communication system, the source of the information to be transmitted or received requires a user to have a recognized userid on a messaging server. Messaging servers typically deal with the transmission and reception of data within an Enterprise. Enterprise servers as described herein are distinct from the messaging servers and control the transmission and reception of data to and from wireless mobile communications devices via wireless communication networks outside of the Enterprise.

The messaging servers and their permissions for access are distinct from the Enterprise servers and their permission of access. Thus, when adding a new user to a messaging server, if the user is to be enabled for mobile messaging functions, the user must also be recognized by an Enterprise server. Traditionally, this would require that the administrator be familiar with the procedures of both the messaging servers and the Enterprise servers, which may be quite disparate systems. For example, a messaging server may be a Microsoft Exchange Server and the Enterprise server a BlackBerry™ Enterprise Server, each of which has a different administration interface. An example of such an Enterprise server is disclosed in U.S. Pat. No. 6,219,694, which was issued to the assignee of the present application on Apr. 17, 2001 and is hereby incorporated by reference. Further, for security reasons it may not be advisable to provide administrators the passwords required to modify user access on both Exchange and Enterprise servers.

Thus, there is a need for an interface that will permit an administrator to administer user accounts on messaging and Enterprise servers without requiring familiarity of the administration interfaces of either. Further, there is a need for an interface that provides restricted access to a limited set of administration functions to protect the security of both Exchange servers and Enterprise servers. The present invention addresses this need.

SUMMARY OF THE INVENTION

According to an aspect of the invention, a system for administrating a wireless communication network comprises an enterprise user administration service, an enterprise user administration client connected to the service, one or more messaging servers connected to the service, and an enterprise server connected to the one or more messaging servers to enable communications between the one or more messaging servers and a wireless communication network.

In accordance with another aspect of the invention, a method for administrating a wireless communication network comprises the steps of waiting for a user administration request from a user administration client, receiving the request at a user administration service and determining if the request is an add user request to enable one or more users for wireless communications, a delete user request to disable one or more users for wireless communications, a list users request to generate a list of users enabled for wireless communications, a verify users request to verify that one or more particular users have been enabled for wireless communications, or another administration request associated with wireless communications, and acting upon the request at the user administration service.

In an alternate embodiment of the invention, a system for administrating a wireless communication network comprises an enterprise user administration component, an administration user interface connected to the component, one or more messaging servers connected to the component, one or more enterprise server agents connected to the component and to a respective one of the messaging servers, and a router connected to the component and to the one or more enterprise server agents to enable communications between the one or more messaging servers and a wireless communication network.

A system for administrating a wireless communication network according to a still further aspect of the invention comprises means for waiting for a user administration request from a user administration client, means for receiving the request at a user administration service and determining if the request is an add user request to enable one or more users for wireless communications, a delete user request to disable one or more users for wireless communications, a list users request to generate a list of users enabled for wireless communications, a verify users request to verify that one or more particular users have been enabled for wireless communications, or another administration request associated with wireless communications, and means for acting upon the request at the user administration service.

A computer readable medium containing instructions for administrating a wireless communication network in accordance with another aspect of the invention comprises instructions for waiting for a user administration request from a user administration client, receiving the request at a user administration service and determining if the request is an add user request to enable one or more users for wireless communications, a delete user request to disable one or more users for wireless communications, a list users request to generate a list of users enabled for wireless communications, a verify users request to verify that one or more particular users have been enabled for wireless communications, or another administration request associated with wireless communications, and acting upon the request at the user administration service.

A system for administrating a wireless communication network, in accordance with a further aspect of the invention comprises an enterprise server connected to one or more messaging servers and a wireless gateway and configured to enable communications between the messaging servers and a wireless communication network through the wireless gateway, an enterprise server user administration service, the service having administration authority to perform any of a plurality of administration functions for the one or more messaging servers, and an enterprise server user administration client connected to the service, the client providing a user interface to the service for a limited set of the plurality of administration functions of the enterprise server user administration service.

BRIEF DESCRIPTION OF THE DRAWINGS

For a better understanding of the present invention, and to show more clearly how it can be carried into effect, reference will now be made, by way of example only, to the accompanying drawings in which.

DETAILED DESCRIPTION OF THE DRAWINGS

Figure 1:
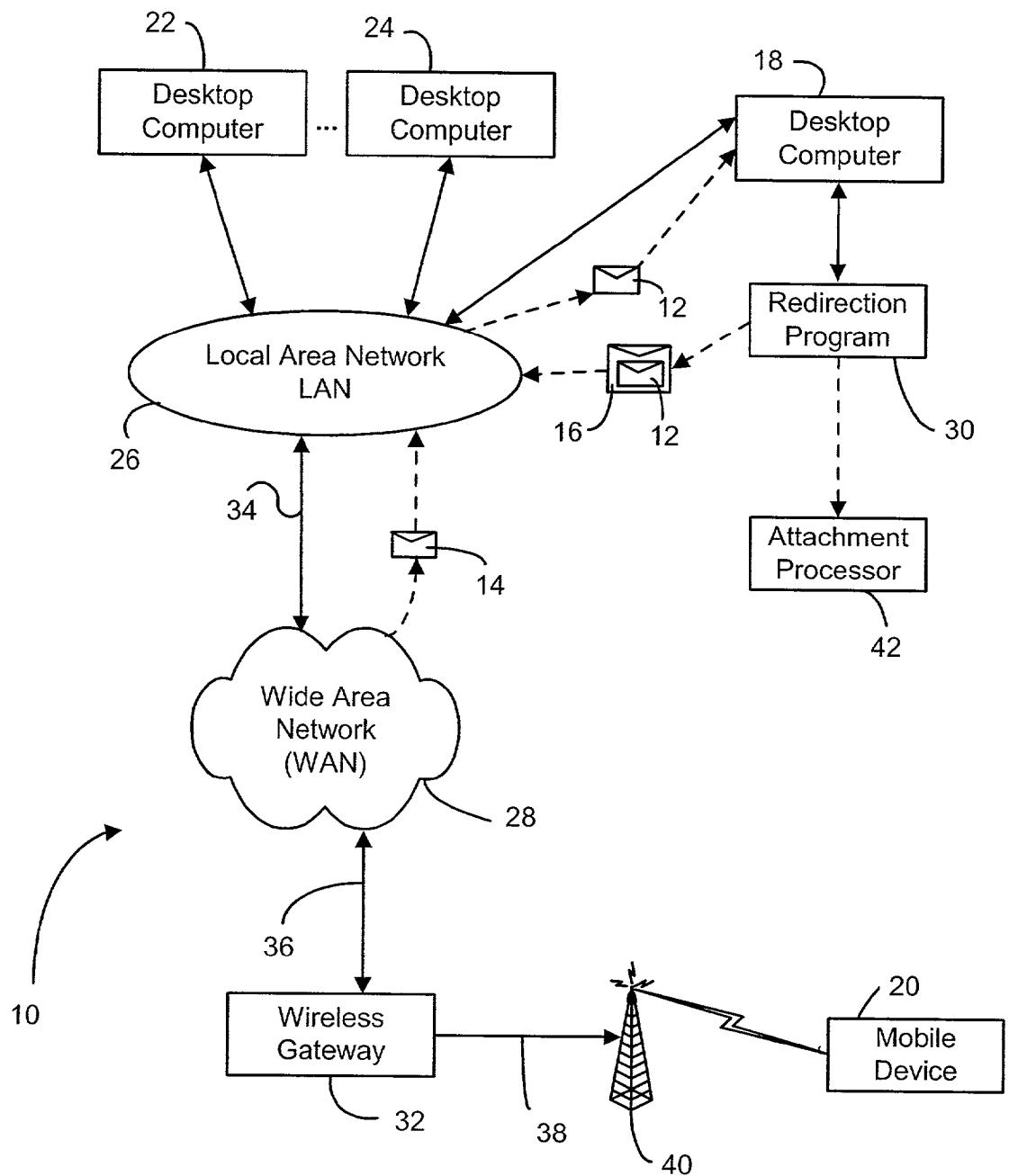
FIG. 1 is a block diagram of a wireless communications system.

Referring now to FIG. 1, a block diagram of a wireless communications system is shown generally as 10. System 10 illustrates the transfer of user data items such as internal message 12, external message 14 or outgoing message 16 between the user's desktop computer 18 and the user's wireless mobile communications device 20, hereinafter referred to primarily as a "mobile device". Internal message 12 represents an internal message sent from desktop computer 22 or 24 to the user's office computer 18 via network 26. Although only desktop computers 22, 24 and user's office computer 18 are shown connected to network 26, as one skilled in the art can appreciate any number of other computers may be connected to network 26. Further, it is not the intent of the inventors to restrict the present invention to a LAN as shown in FIG. 1. Any number of networks that connect systems capable of receiving and transmitting data are considered by the inventors to be a network 26.

External message 14 represents an external message from a sender that is not directly connected to network 26 such as a message from the user's mobile device 20, some other user's mobile device (not shown), or any user connected to Wide Area Network (WAN) 28. External message 14 may also be a command message from the user's mobile device 20 to the user's office computer 18. Outgoing message 16 is internal message 12 with an outer envelope.

A redirection system, embodied in FIG. 1 as the redirection program 30 running on user's office computer 18, repackages internal message 12 as outgoing message 16 by providing an outer envelope that contains the addressing information of user's mobile device 20.

Messages 14 and 16 are transmitted via WAN 28, which is preferably the Internet, which utilizes the Transmission Control Protocol/Internet Protocol ("TCP/IP") to Exchange information, but which, alternatively could be any other type of WAN. Network 26 and WAN 28 are connected via communication link 34, which is typically a high bandwidth link such as a T1 or T3 line. WAN 28 is in turn is connected to a wireless gateway 32, via connection 36. Connection 36 serves as a bridge between WAN 28 and one or more other networks, such as an RF wireless network, cellular network, satellite network, or other synchronous or asynchronous land-line connection.

Wireless gateway 32 communicates via link 38 through one or more wireless networks 40 to any of a plurality of mobile devices 20.

System 10 includes the ability to redirect certain message attachments to an attachment processor 42 if redirection program 30 determines that the user's mobile device 20 cannot receive and process attachments to a message 12. The attachment processor 42 may for example be a FAX machine, a printer, a system for displaying images (such as video) or a machine capable of processing and playing audio files, such as a voice mail system. Also, the user may have specified that certain attachments are not to be forwarded to user's mobile device 20, even if the mobile device 20 can process those attachments. By way of example, consider an E-mail sent to a user that includes three attachments—a word processing document, a video clip and an audio clip. Redirection program 30 could be configured to send the text of the E-mail to user's mobile device 20, to send the word processing document to a networked printer located near the user, to send the video clip to a store accessible through a secure connection through the Internet, and to send the audio clip to the user's voice mail system. This example is not intended to limit the breadth and scope of the invention, but rather to illustrate the variety of possibilities embodied in the redirection concept.

The mobile device 20 is preferably a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via wireless network(s) 40 and link 38. Although it is preferable for system 10 to operate in a two-way communications mode, system 10 could be beneficially used in a "one and onehalf" or acknowledgment paging environment, or even with a one-way paging system. The mobile device 20 includes software program instructions that work in conjunction with redirection program 30 to enable the seamless, transparent redirection of user-selected data items.

A user of system 10 can configure redirection program 30 to push certain user-selected data items to the user's mobile device 20 when redirection program 30 detects that a particular user-defined event trigger (or trigger point) has taken place. This is made possible by wireless gateway 32, which implements this routing and push functionality. User-selected data items may include: E-mail messages, calendar events, meeting notifications, address entries, journal entries, personal alerts, alarms, warnings, stock quotes, news bulletins, etc., but could, alternatively, include any other type of message that is transmitted to user's office computer 18, or that computer 18 acquires through the use of intelligent agents, such as data that is received after the computer 18 initiates a search of a database or a website or a bulletin board. In some instances, only a portion of the data item is transmitted to mobile device 20 in order to minimize the amount of data transmitted via link 38. In these instances, mobile device 20 can optionally send a command message to the host system to receive more or all of the data item if the user desires to receive it.

FIG. 1 shows internal message 12 being communicated over network 26 from a desktop computer (22, 24) to the user's office computer 18. Also shown in FIG. 1 is external message 14, which could be an E-mail message from an Internet user, or could be a command message from the user's mobile device 20. Once message 12 or 14 reaches the primary message store of user's office computer 18, it can be detected and acted upon by redirection program 30. Redirection program 30 can use many methods of detecting new messages. A preferred method of detecting new messages is using the Microsoft® Messaging API (MAPI), in which programs, such as redirection program 30, register for notifications or 'advise syncs' when changes to a mailbox take place. Other methods of detecting new messages for forwarding to mobile devices such as 20 could also be used, since the administration aspects of the present invention are not dependent upon any particular message detection scheme.

In operation, when the message 12 is received at the user's office computer 18, redirection program 30 detects its presence and prepares message 12 for redirection to the user's mobile device 20. In preparing the message for redirection, redirection program 30 could compress internal message 12, could compress the message header, and could also or instead encrypt the entire message 12 or portions thereof to create a secure link to the user's mobile device 20.

Also programmed into the redirection program 30 is the address of the user's mobile device 20, the type of device, and whether mobile device 20 can accept certain types of attachments, such as word processing or voice attachments. If the user's mobile device 20 cannot accept these types of attachments, then redirector software 30 can be programmed to route the attachments to an appropriate machine 42.

After the redirection program 30 has determined that a particular message such as 12 should be redirected, and it has prepared the message for redirection, the software 30 then sends internal message 12 to a message store located in the user's mobile device 20, using whatever means are necessary. In a preferred embodiment the message 12 is sent back over network 26, WAN 28, and through link 38 to wireless device 20. Redirection program 30 preferably repackages internal message 12 as an E-mail with an outer envelope to create outgoing message 16. The outer envelope contains the addressing information of the user's mobile device 20, although alternative repackaging techniques and protocols could be used, such as a TCP/IP repackaging and delivery method. Wireless gateway 32 requires this outer envelope information in order to know where to send outgoing message 16. Wireless gateway 32 acts as a central routing point for all mobile devices 20 in one or more wireless networks. It also implements a method to allow pushing of data items to such devices and thus provides for "always on, always connected" type of operation of the user's mobile device 20. No dial-up or other user-initiated connection is required for retrieval of the data items. Those skilled in the art will appreciate that most WANs, like the Internet for example, do not allow direct pushing of information to a network endpoint.

Once outgoing message 16 is received by the user's mobile device 20, the outer envelope is removed and the message 12 is placed in the memory store within the user's mobile device 20. By repackaging and removing the outer envelope in this manner, the present invention causes the user's mobile device 20 to appear to be at the same physical location as the user's office computer 18, thus creating a transparent system.

In the case where message 14 is representative of an external message from a computer connected to WAN 18 to the user's office computer 18, and computer 18 has been configured to redirect messages 14, then in a similar manner to message 12, message 14 would be repackaged with an outer envelope to create message 16. Message 16 would then be transmitted to user's mobile device 20. In the case where message 14 is representative of a command message from user's mobile device 20 to user's office computer 18, the message 14 is not redirected, but is acted upon by user's office computer 18.

If message 16 is an E-mail message, the user at the user's mobile device 20 sees the original subject, sender's address, destination address, carbon copy and blind carbon copy. When the user replies to message 16, (thus creating a message 14) the software operating at the user's mobile device 20 adds a similar outer envelope to the reply message to cause the reply message to be routed first to the user's office computer 18, which then removes the outer envelope and redirects the message to the final destination, such as back to desktop computer 22. In a preferred embodiment, this results in the outgoing redirected message from the user's office computer 18 being sent using the E-mail address of the computer 18, rather than the address of the mobile device 20. Thus it will appear to the recipient of the message that the message originated from the user's office computer 18 and not mobile device 20. Any replies to the redirected message will then be sent to the user's office computer 18, which if it is still in redirection mode, will repackage the reply and send it to the user's mobile device 20, as described above.

In an alternative embodiment to the configuration of system 10 shown in FIG. 1, a server may be utilized to run redirection program 30. Thus rather than requiring each user to run redirection program 30 on their office computer 18, a server could service multiple users. Such a configuration is particularly advantageous for use with message servers such as a Microsoft Exchange Server, which is normally operated so that all user messages are kept in one central location or mailbox store on the server instead of in a store within each user's office computer 18. This configuration has the additional advantage of allowing a single system administrator to configure and keep track of all users having messages redirected. If the system includes encryption keys, these too can be kept at one place for management and update purposes.

Figure 2:
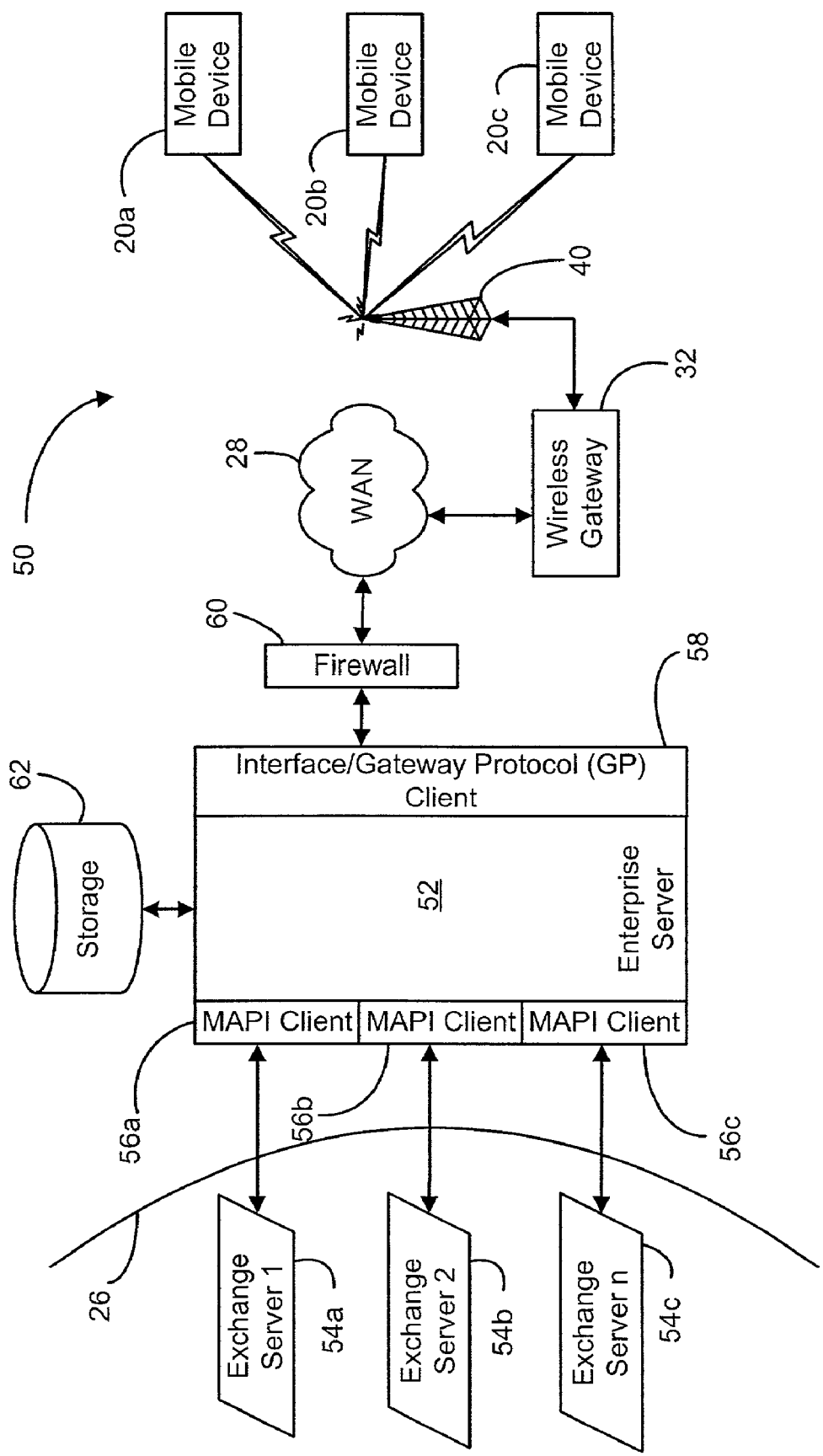
FIG. 2 is a block diagram of a first Enterprise server system.
Figure 5:
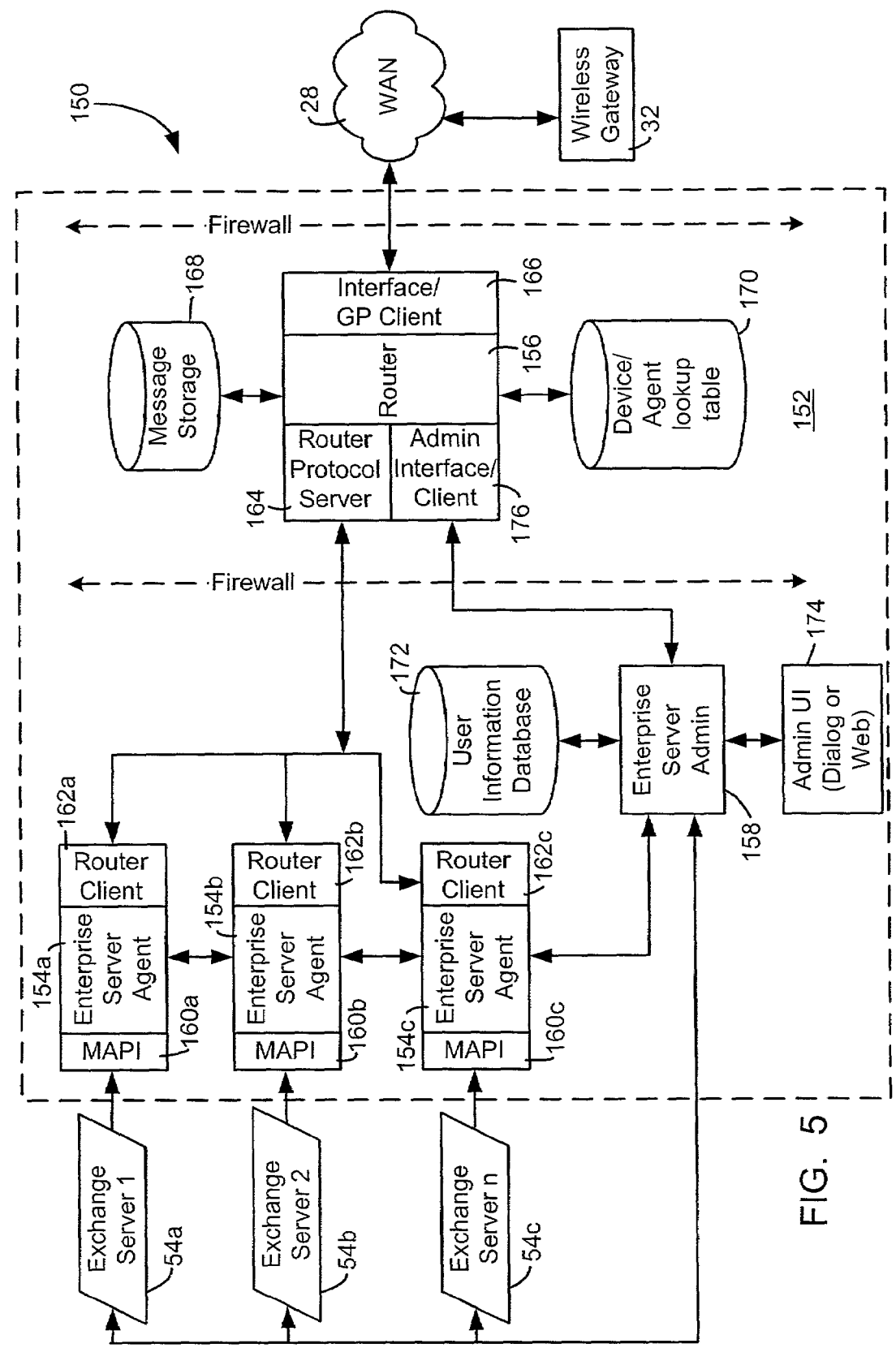
FIG. 5 is a block diagram of a second Enterprise server system.
Figure 6:
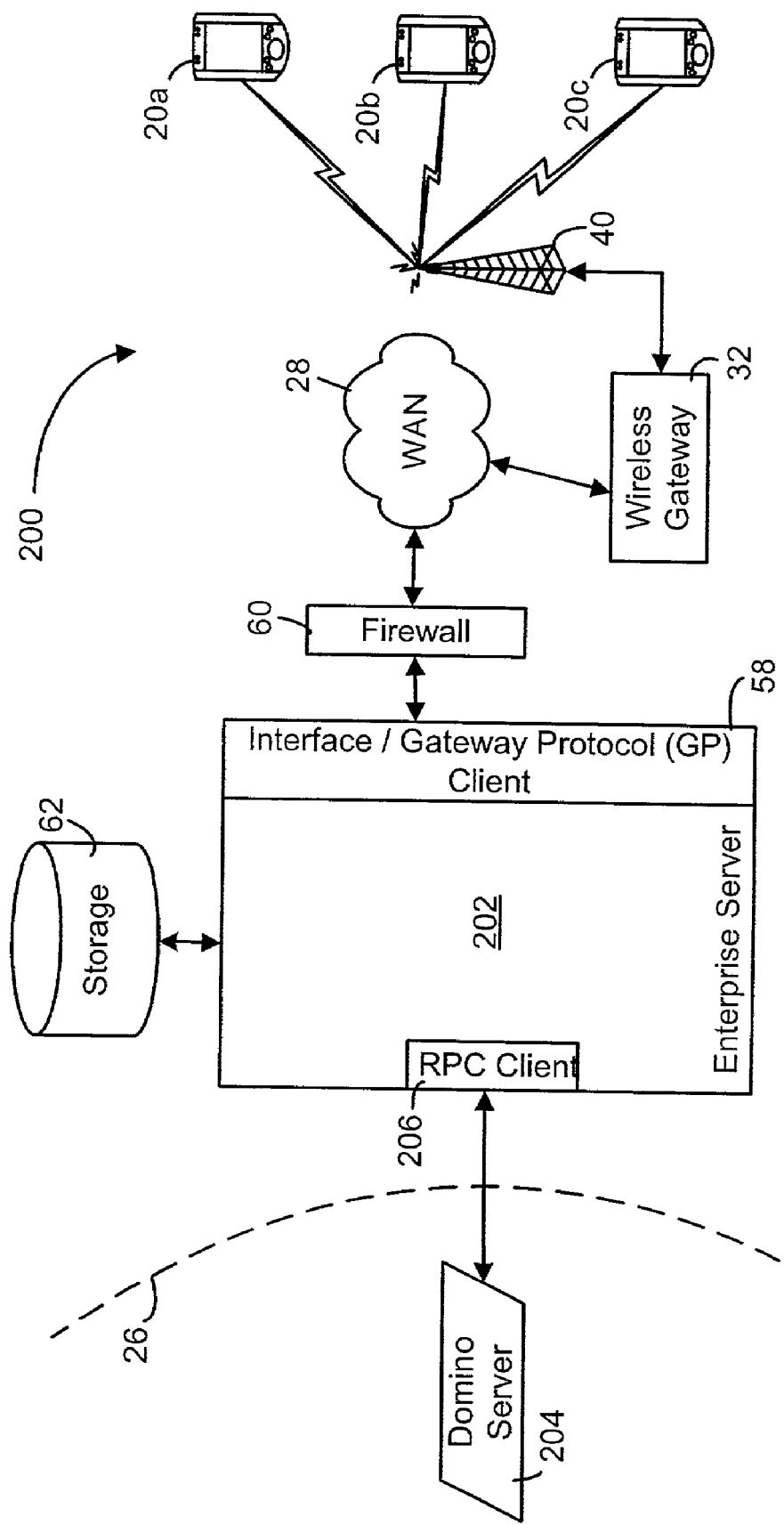
FIG. 6 is a block diagram of a third Enterprise server system.

Referring now to FIG. 2, a block diagram of a first Enterprise server system is shown generally as 50. System 50 shows an implementation where the redirection program 30 is running on an Enterprise server 52 rather than on individual desktop computers. Messaging servers are shown in FIG. 2 as Microsoft Exchange servers. For the purpose of clarity, only three Exchange servers 54a, 54b and 54c are shown. The presence of particular desktop computers, workstations and other network servers will be obvious to those skilled in the art, and has been indicated generally by the dotted line 26 which represents network 26 of FIG. 1. Those skilled in the art will also appreciate that the Exchange servers 54a, 54b and 54c, will also normally be connected through the firewall 60 or other components to receive electronic messages from the WAN 28 or other network. Thus, although these connections have not been shown to avoid congestion in the drawings, the Exchange servers 54a, 54b and 54c in FIG. 2, as well as those in FIG. 3 and the server shown in FIGS. 5 and 6, are preferably connected to enable typical messaging functions both within the network 26 and between workstations connected in the network 26 and external messaging systems. As described above, an server such as 52 operates in conjunction with the messaging servers such as the Exchange servers 54a, 54b and 54c (or server 204 in FIGS. 5 and 6) to enable communication of messages and other data items between messaging servers and mobile devices.

It is assumed that E-mail is stored at Exchange servers 54a, 54b and 54c in the network 26, or alternatively forwarded to Enterprise server 52 when redirection is initiated.

Enterprise server 52 accesses Exchange servers 54a, 54b and 54c in network 26 from which redirection is to be enabled and implements redirection program 30 (see FIG. 1). Network 26 is preferably a corporate network which extends throughout corporate premises or an entire corporate Enterprise. Enterprise server 52 accesses Exchange servers 54a, 54b and 54c via MAPI clients 56a, 56b and 56c respectively in order to detect incoming E-mail messages which should be redirected from desktop systems in network 26 to associated mobile devices 20. Enterprise server 52 also couples Exchange servers 54a, 54b and 54c through WAN 28 to wireless gateway 32.

Although Enterprise server 52 requires a connection through firewall 60 to WAN 28, the integrity of the firewall 60 is not compromised. Enterprise server 52 initiates its connection to WAN 28 only in an outbound direction. Unauthorized access to network 26 from outside firewall 60 through the Enterprise server connection is thereby prevented. When a connection to wireless gateway 32 through WAN 28 is established, Enterprise server 52 maintains the connection, thereby avoiding operations to re-establish the connection every time a message or information is to be redirected to a mobile device 20. This open connection between Enterprise server 52 and the wireless gateway 32, once established, provides for "always on, always connected" functionality of a wireless device 20.

Enterprise server 52 is also coupled to a data store 62 in which a variety of information, such as user information, configuration information, logging information and messages or portions thereof may be retained.

System 50 system operates as described above to continuously redirect messages and possibly other data items from user accounts associated with Exchange servers 54a, 54b, 54c in network 26 to corresponding mobile devices 20a, 20b and 20c as required. Information associated with the desktop systems is thereby mirrored on the mobile devices 20a, 20b and 20c.

Enterprise server 52 implements MAPI clients 56a, 56b, and 56c to interface with each Exchange server 54a, 54b and 54c. Although multiple Exchange servers are shown in FIG. 2, relatively small networks with few users may have only a single Exchange server, such that a single MAPI client would be implemented in Enterprise server 52. In the event that further Exchange servers are added to an existing network 26 after installation of Enterprise server 52, a corresponding number of new MAPI clients would be added to Enterprise server 52 to enable redirection of messages from such additional Exchange servers, provided that the capacity of Enterprise server 52 is not exceeded.

MAPI clients 56a, 56b and 56c are configured to receive notifications of changes to any mailboxes on the Exchange servers 54a, 54b or 54c which are "wirelessly enabled" or configured for redirection of incoming messages to a mobile device 20a, 20b or 20c. Enterprise server 52 maintains a list of users whose mailboxes are wirelessly enabled and thereby determines for which mailboxes the MAPI clients should receive notifications. In preferred embodiments of the invention, MAPI clients 56a, 56b and 56c are designed to implement a desired notification scheme in order to provide for a more simple installation of Enterprise server 52 with an existing network 26. Redirection functionality can thereby be provided while requiring minimal changes to the Exchange servers on the existing network 26.

Enterprise server 52 will normally be configured to respond to only particular selected mailbox changes among the many possible changes that may occur within a user's mailbox. Even though Exchange servers 54a, 54b and 54c may provide notifications of all changes to all mailboxes, only certain changes to wirelessly enable mailboxes will require any action by Enterprise server 52. For example, although the Exchange servers may provide notifications to MAPI clients 54a, 54b and 54c when messages are moved from one folder to another within a user's mailbox or deleted from a folder or folders in a user's mailbox, no redirection operations may be required by Enterprise server 52. When a new message arrives at a wirelessly-enabled mailbox however, Enterprise server 52 must respond to the associated notification from an Exchange server by executing operations to redirect the new message to the user's mobile device 20, provided that redirection has been enabled. Any determinations of the type of mailbox change notification and whether or not any redirection functions are necessary are preferably made within Enterprise server 52. As described above, such an arrangement would minimize network changes required to incorporate a redirection system according to the invention into an existing network 26.

Although Enterprise server 52 is shown outside network 26, in some implementations Enterprise server 52 will be running as a service within network 26, as a Windows NT® service for example. As such, those skilled in the art will appreciate that administration functions for Enterprise server 52 may be integrated with other network service administrative arrangements. Since Enterprise server 52 operates in conjunction with Exchange servers 54a, 54b and 54c, Enterprise server administration could be integrated with Exchange server administration, as an Exchange extension for example. When an existing user's mailbox is to be enabled for redirection of messages to a wireless device 20, an Exchange administrator may add the user to Enterprise server 52 through a mailbox extension. For a new user, the Exchange administrator may add the user's mailbox on an Exchange server and also add the user to Enterprise server 52 during a single login session.

Although such integrated administration may be convenient under some circumstances, there are also some associated disadvantages. For example, simply enabling an existing user's mailbox for wireless redirection of messages by adding the user to Enterprise server 52 requires intervention by either an Exchange administrator or an Enterprise server administrator with Exchange administration permission or privileges. Therefore, Exchange administrators must be familiar with both Exchange servers and Enterprise server 52, or Enterprise server administrators must have full Exchange administration permissions. For an Exchange administrator, the increased workload and knowledge required to administer the additional Enterprise server 52 would likely be perceived as a negative impact of installing a network redirection solution. On the other hand, in the interest of maintaining network control and integrity, network administrators normally strive to minimize the number of network accounts having administration privileges. Granting a full set of Exchange administrative permissions to an Enterprise server administrator is thus contrary to such common network administration principles.

Figure 3:
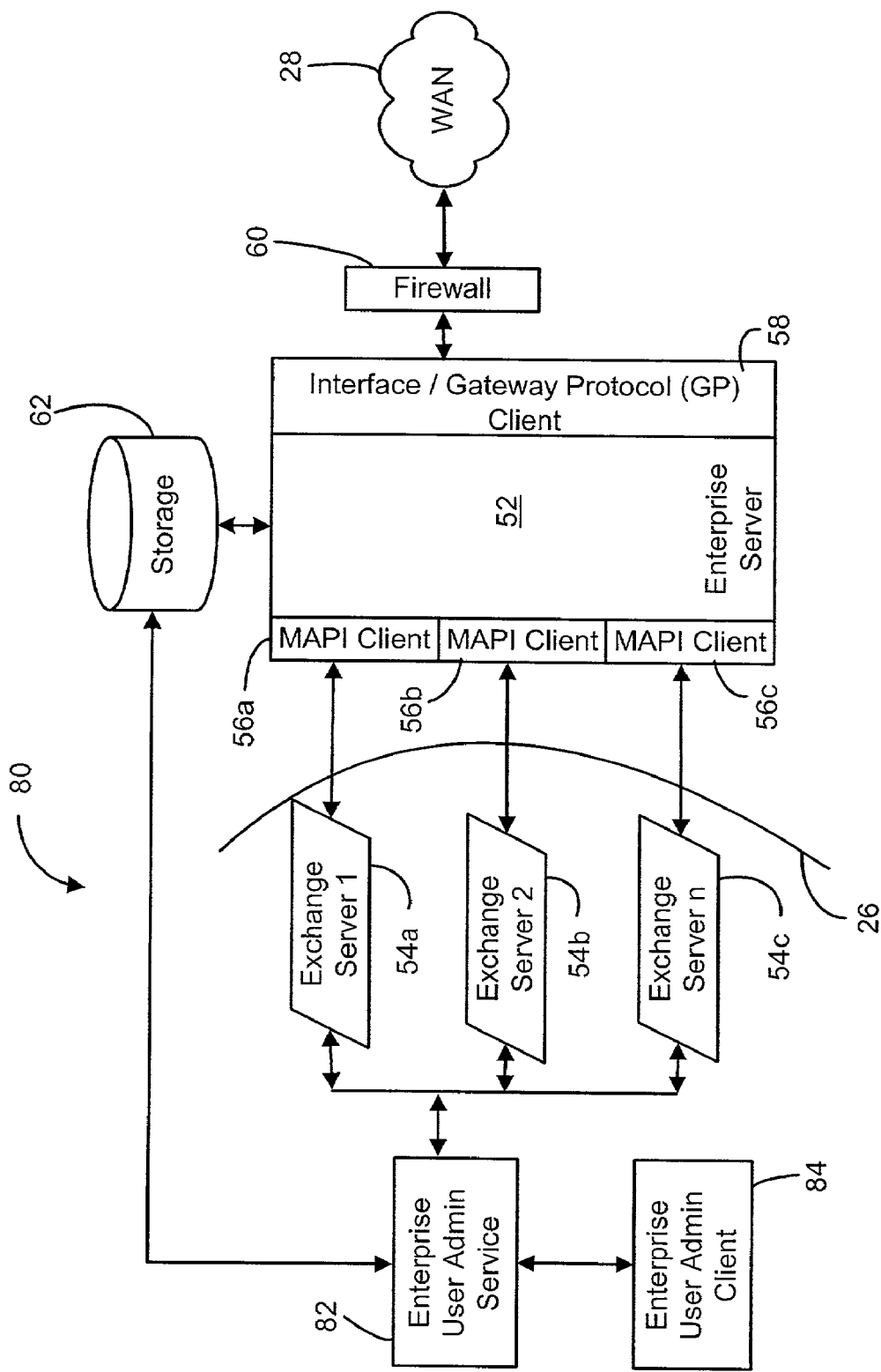
FIG. 3 is a block diagram of the system of FIG. 2 incorporating a user administration system.

FIG. 3 is a block diagram of the system of FIG. 2 incorporating a user administration system and is shown generally as 80. Administration of Enterprise server 52 may be accomplished through an administration service and client arrangement shown in system 80. In system 80, Enterprise user administration service 82, is installed and executed on a computer which can communicate with Exchange servers 54a, 54b and 54c, and has Exchange administration rights. Service 82 may instead run on one or more of Exchange servers 54a, 54b and 54c. As will be apparent, administration rights are normally associated with network accounts instead of particular computers. Provided that a computer user logs on using an account having Exchange administration rights or a computer is configured to run under a specific account having Exchange administration rights, service 82 may be executed on that computer.

Enterprise user administration service 82 preferably runs in the background on the computer on which it is installed. An Enterprise server administration client 84 is similarly installed on a computer in network 26 and communicates with service 82 to perform Enterprise server administration functions, as discussed below.

Although Enterprise user administration service 82 must be running on a computer having Exchange server administration permissions, client 84 may be installed on any computer within network 26 which can communicate with the computer on which service 82 is running. Enterprise server administration features are thereby provided through client 84 without requiring Exchange administration privileges or permissions. Administration functions for Enterprise server 52 remain integrated with Exchange server administration, in that the service 82 performs Enterprise server administration through Exchange administration arrangements as described above. However, client 84 requires no Exchange administration permissions; only the service 82 requires such administration rights.

Thus system 80 thereby provides for flexibility in assignment of Exchange administration rights to Enterprise server administrators.

Enterprise user administration service 82 is preferably configured to provide for common Enterprise server administration functions, including but in no way limited to: adding users to an Enterprise server 52, deleting users from an Enterprise server 52, listing all users on an Enterprise server 52, and verifying that a particular user exists on a particular Enterprise server 52. As such, only a restricted set of Exchange administration rights is available to Enterprise server administrators through administration client 84. Even though service 82 may have full Exchange administration rights, it is tailored to provide only specific Enterprise server administration functions to client 84. Therefore, Enterprise administration for existing Exchange users through Enterprise user administration client 84 requires no intervention by Exchange administrators.

Figure 4:
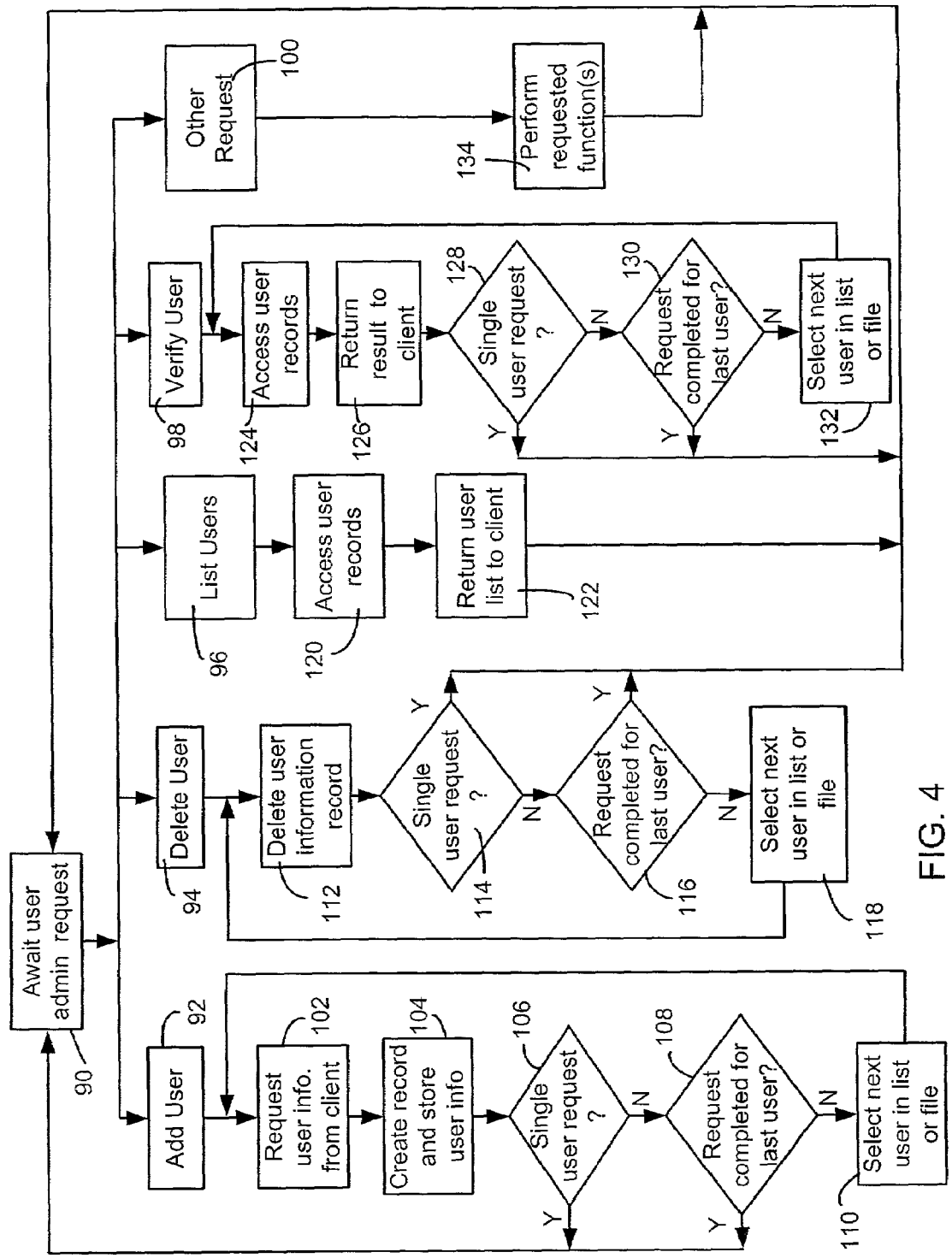
FIG. 4 is a logical flowchart of the functions of the user administration system of FIG. 3.

FIG. 4 is a logical flowchart of the functions of the user administration system of FIG. 3. Administration processing at client 84 starts at a step 90 when an administration function is entered or selected. The administration request is then sent to service 82, which performs the actual administration function or functions specified in the administration request from the client 84. In preferred embodiments, client 84 is adapted to provide for only a limited set of specific Enterprise server administration functions, preferably including the most frequently executed administration functions. Client 84 may also possibly provide for other administration functions for which the messaging system owner or operator wishes to avoid Exchange administrator intervention. By providing for more Enterprise server administration functions through client 84 and service 82, network and Exchange administrator involvement in Enterprise server administration may be minimized. However, such broader administration functionality through client 84 and service 82 would effectively provide access to a higher level of Exchange administration rights through client 84. Therefore, network and/or Exchange administrators must trade off ease of Enterprise server administration against assignment of Exchange administration rights.

In the example illustrated in FIG. 4, client 84 provides the user administration functions of: adding 92, deleting 94, listing 96, verifying 98 and other requests 100.

When service 82 determines that an add user request has been sent by client 84, a user information record must be created, either on an Exchange server 54a, 54b or 54c or in the data store 62 associated with Enterprise server 52. User information, such as a user name, a mailbox name and a wireless device, is requested by service 82 where necessary at step 102 or may be initially supplied by client 84 with the add user request and is stored in a user information record in data store 62 at step 104. At step 106 a test is made to determine if the add user request relates to a single user. If the request is for a single user, control returns to step 90 and the service 82 and client 84 revert to a background or waiting state until a further administration request is made at client 84.

The administration system of FIG. 4 also supports multiple-user administration with a single client request. An administration request from client 84 may specify a list of users or an identifier for a file containing a list of users for which the same administration function is to be performed. In the example of adding a user, if at step 106 it is determined that the request is not restricted to a single user, it is then determined a step 108 whether or not the previously executed add user function was associated with the last user in the multiple-user list. If so, then the multiple-user request has been completed and control is returned to step 90. If the request has not yet been completed for all users in a list or file however, processing continues at step 110 to select a next user from the list or file, after which control returns to step 102.

A delete user administration function begins at step 94 and is executed in a similar manner to the add user function, except that an existing user information record is deleted at step 112. Steps 114, 116 and 118 provide multiple-user request functionality as described above with regard to the add user function.

A list users request begins at step 96. At step 120 existing user records are accessed and a list of Enterprise server users is returned to client 84 at step 122. Although not shown in FIG. 4, a multiple Enterprise server list request may also be supported by the user administration system. A multiple server list request would be processed similarly to a multiple user request, with the list user operations being repeated for all Enterprise servers specified in the request. However, such a list request would only be appropriate in a messaging system with more than one Enterprise server, since the list request generates a list of all of the users of an Enterprise server.

A verify user request begins at step 98. At step 124 user information records are accessed. Service 82 checks all user information stored by Enterprise server 52 and returns a result to client 84 at step 126. Since an administrator may need to verify that a number of users exist on Enterprise server 52, a multiple-user verify request is supported and processed as described above and is represented at steps 128, 130 and 132.

The add user, delete user, list users and verify user administration functions are common Enterprise server administration functions that could be performed through a client 84 and service 82. These functions are for illustrative purposes only, it is not the intent of the inventors to limit the invention to these functions only. Other Enterprise server user administration functions, indicated generally at steps 100 and 134 could also be performed through a client-service arrangement.

As described above, this administration arrangement assumes that the user has an existing Exchange mailbox. Therefore, new users must first be added to an Exchange server 54a, 54b or 54c by an Exchange administrator before the Enterprise user administration client 84 can be used to add the user to Enterprise server 52. Adding the user to an Exchange server would be required for all new Exchange users, regardless of whether or not an Enterprise server 52 is provided in network 26, and thus does not represent any new work for an Exchange administrator.

Enterprise user administration client 84 can be installed and run on any computer in network 26 that can communicate with a computer that is running service 82. As described above, service 82 may only be executed by a user with Exchange administration rights or on a computer running under an account with Exchange administration rights. Client 84 requires no such administration rights and thus can be either made accessible to any users or restricted to any particular users or Enterprise server administrators, in accordance with the preferences of the system administrators. Restricted client arrangements embody a higher degree of control over Enterprise server administration, whereas unrestricted or all-user access to client 84 or at least specific client functions provides for remote administration of an Enterprise server. For example, client 84 might be included as part of a software package which is installed at a desktop computer in a network from which messages are to be redirected. Every user could then run client 84 to perform some or all of the supported Enterprise server administration functions. Alternatively, client 84 may be configured to execute an add user or other administration procedure automatically, for example the first time a user connects a mobile device 20 to the user's desktop system 18.

Client 84 may be implemented as a command line utility, in which administration functions supported by client 84 are invoked by entering a properly formatted text command according to a predetermined syntax. For multiple-user administration functions, a list of users could be either supplied as part of the command, or a file containing such a list could be specified in the command. Alternatively, the administration commands could instead be built into a custom web-based interface, a graphical user interface (GUI) or automated scripts. A web-based, network-based or other shared interface offers the additional advantage that client component 84 could be installed on only a single computer or a relatively small number of computers and invoked by any user from any computer within the network.

Although the description above refers to adding users to Enterprise server 52, user information may actually be stored on an Exchange server 54a, 54b or 54c. In such systems, the user information is preferably stored in Exchange folders accessible by Enterprise server 52. Enterprise server 52 may instead store user information in data store 62. As will be apparent to those skilled in the art, regardless of where user information is stored, on an Exchange server or in data store 62 associated with Enterprise server 52, when a user is added, user information is written to the appropriate storage location. Deleting a user from Enterprise server 52 causes corresponding user information to be either erased or overwritten.

In order to execute the list users function or the verify user function, Enterprise server 52 accesses the user information, wherever it is stored.

The function of adding a user to Enterprise server 52 effectively enables the user's mailbox on an Exchange server for message redirection to the user's mobile device 20. Similarly, by deleting a user from Enterprise server 52, message redirection to a mobile device 20 is disabled. Each mobile device 20 has a unique identification number, generally called a personal identification number or PIN, associated therewith. Adding a user to Enterprise server 52 creates a correspondence between the user's mailbox on an Exchange server and the particular wireless device 20 to which messages addressed to the user are to be redirected. The user information which is stored in either an Exchange server or a data store 62 when the user is added to Enterprise server 52 includes the particular PIN for the user's mobile device 20. The user information also preferably includes the user name, mailbox name, E-mail address or other information which identifies the user or mailbox from which redirection is enabled.

In addition to user identification and PIN information stored to user records when a user is added to Enterprise server 52, an indication of the redirection status of the user's office computer 18 is also stored with the Enterprise server user information. The status indicator would store at least the latest redirection status, such as "running" to indicate that incoming messages are currently being redirected to the user's mobile device 20, or "disabled" to indicate that message redirection is not currently active. Other or further status information may also be stored with the user information, including for example the name of Enterprise server 52 through which messages for the user are to be redirected, statistical information relating to the number of messages sent to or from the wireless device, the number of messages pending to the wireless device, the number of messages that have expired before being sent to the wireless device, the number of messages not sent to the wireless device in accordance with filtering rules, the times that messages were last sent to or received from the wireless device, the time of last contact with the wireless device, the result of the most recent transaction involving the wireless device, and the like.

Referring back to FIG. 2, in traditional messaging schemes such as those based on MAPI, a messaging session is conducted between a messaging client and a messaging server over some communication means, which as shown in FIG. 2 may involve a network connection between a MAPI client 56a, 56b, or 56c, and an Exchange server 54a, 54b or 54c.

A first problem with traditional messaging occurs when communication with a server is interrupted: the session hangs up and the client blocks until the service is stopped and started again. This blocking problem affects any system that uses traditional messaging clients such as MAPI clients to access messaging servers such as Exchange servers. In system 50 of FIG. 2, Enterprise server 52 can also block, in a similar way that a traditional messaging client can. However, the blocking problem is compounded in systems such as 50 because several messaging sessions can be operating on Enterprise server 52 when multiple MAPI clients 56a, 56b and 56c are implemented. A fault in any one messaging session can cause Enterprise server 52 to hang up, thereby blocking communications between the wireless gateway 32 and all Exchange servers 54a, 54b and 54c, not only the server with the faulty messaging session.

A second problem is encountered in large deployments, such as when several Exchange servers exist in various locations, often as a result of the progressive growth of an organization. As new Exchange servers and corresponding MAPI clients are added, their number can quickly exceed the capacity of a single Enterprise server 52. One possible solution is to add another Enterprise server in the same corporate network. However, a further Enterprise server would introduce another connection through the corporate firewall 60 over WAN 28. Also, when a user changes location and is moved from one Enterprise server to another, new routing information must be obtained. Central administration of such distributed systems presents a further challenge.

Referring now to FIG. 5, a block diagram of a second Enterprise server system is shown generally as 150. System 150 illustrates an alternative Enterprise server architecture which overcomes the above potential problems. In system 150, functions of a distributed Enterprise server 152 are distributed among distinct server components, each of which may be running on a dedicated computer. Distributed Enterprise server 152 comprises multiple Enterprise server agents 154a, 154b and 154c, connected to a router 156; the agents and router are also connected to Enterprise server administration 158.

Each agent (154a, 154b, 154c) monitors mailboxes on a specific Exchange server (54a, 54b, 54c) and, when required, sends new messages to the user's wireless device 20 (not shown) via router 156 and wireless gateway 32. Agents 154a, 154b and 154c also manage incoming messages that are initiated by wireless devices 20. As in system 50 (FIG. 2) there is a one-to-one relation between the number of MAPI clients and the number of Exchange servers, although each MAPI client 160a, 160b and 160c in the distributed Enterprise server 152 is implemented in a separate agent 154a, 154b and 154c, preferably on a different computer than all other MAPI clients and agents. Each agent 154a, 154b and 154c comprises a MAPI client and a router interface 162a, 162b and 162c respectively. Although there may be many agents in distributed Enterprise server 152, each agent is designed to monitor mailboxes on a single Exchange server. The one to one relationship between Exchange servers 54a, 54b, 54c and agents 154a, 154b and 154c provides for both fault tolerance and scalability.

If a MAPI session between an Exchange server, 54a for example, and its corresponding agent 154a fails and causes the agent 154a to block, other Exchange servers 54b and 54c, and agents 154a and 154b can continue to operate without failure. This provides fault tolerance with respect to messaging session failure, which overcomes the above blocking problem discussed above with regard to the configuration of server 52 of FIG. 3.

System 150 also facilitates expansion of Enterprise server capacity. When a new Exchange server is added, a corresponding agent is added to Enterprise server 152 to handle the new Exchange server. Thus only one Enterprise server system component instead of an entire Enterprise server is required to accommodate new Exchange servers. In system 50 of FIG. 3, a new Enterprise server 52 would tend to be under utilized at first, and as further Exchange servers are added, the Enterprise server would saturate to capacity. With the distributed Enterprise server system architecture of system 150, the messaging server load is always distributed between the agents 154a, 154b and 154c. Intercommunication between the agents 154a, 154b and 154c also provides for load balancing among the agents. Messaging server load can thus be distributed equally among all operable agents.

Each agent 154a, 154b and 154c may possibly run on a dedicated computer, but is preferably implemented on the same computer that is operating the corresponding Exchange server 54a, 54b or 54c.

A router protocol is used in communications between agents 154a, 154b and 154c, which may for example act as router clients 162a, 162b, and 162c. The router clients are connected to a router protocol server 164 of router 156. In a preferred embodiment, the router protocol is a proprietary BlackBerry Enterprise Server ("BES") Router Protocol ("BRP"). BRP is a TCP/IP-based communication protocol and is the point-to-point protocol used as part of the process of passing data between an agent 154a, 154b or 154c and a user's mobile device 20 via router 156 and wireless gateway 32.

Router 156 further comprises a wireless gateway interface 166. Similar to router protocol server 164, gateway interface 168 may also be embodied as a gateway protocol (GP) client. The gateway protocol governs communications between the Enterprise server 152 and wireless gateway 32 via WAN 28 and is preferably a TCP/IP-based protocol. One example of such a protocol is described in International (PCT) Patent Application S/N PCT/CA01/01814, entitled "Wireless Router System and Method" and filed on Dec. 21, 2001.

In system 150, router 156 acts as a client in order to communicate with wireless gateway 32. Router 156, as a router server, is responsible for communicating with all router clients in the Enterprise system 150, and in particular with the agents 154a, 154b, 156c and their router clients 162a, 162b and 162c. Router 156 multiplexes many router protocol sessions from several agents into a single session using the gateway protocol, such as the above proprietary SRP. Router 156 also transfers messages from the agents 154a, 154b and 154c to wireless gateway 32 via the single gateway protocol client connection to wireless gateway 32.

Router 156 maintains a list of in-process transactions and their current state in storage, thereby providing transaction persistence. Once a message is successfully sent to router 156 and saved to message store 168, it need not be resent by agent 154a, 154b or 154c.

When router 156 receives a message from a user's mobile device 20, through wireless gateway 32, a device/agent lookup table 170 is accessed to determine which particular agent is handling the user's Exchange server messaging account.

Messages destined for mobile devices 20 do not require any lookup and are passed on to the wireless gateway 32. Preferably, mobile device and agent information is extracted from outgoing messages and compared to the information in table 170 to ensure that the user information database 172 and the mobile device/agent lookup table 170 remain synchronized.

Enterprise server administration 158 stores administration and configuration information in a user information database 172.

In order to administer all the routers 156 and agents, an administration user interface ("UI") 174 is provided, which may be either dialog or web based. The user administration of Enterprise server 152 is substantially the same as described above in relation to Enterprise server 52. The administration UI 174 acts as a client to Enterprise server administration 158, which requires Exchange server administration rights. In the distributed Enterprise server 152 however, the administration arrangement must be adapted to accommodate the various server components. For example, Enterprise server administration 158 must provide for addition of new agents to work with agents 154a, 154b and 154c. In systems 50 and 80 (FIGS. 2 and 3), any new MAPI clients are preferably integrated with Enterprise server 52. When a new agent is to be added in the distributed Enterprise server 152, however, various information records must be updated or created and stored. For any new agent, an identification of the router 156 to which the agent is to be connected and the machine or computer on which the agent will run, the name of the agent, the particular Exchange server that the agent should monitor (which will normally be a new Exchange server) and the network account under which the agent will run as a network service must be specified by an Enterprise server administrator.

Enterprise server administration 158 will assign a router ID and an authentication key to a new agent and generate an agent ID. The server domain name for the corresponding Exchange server will be retrieved by Enterprise server administration 158 through its interface with the particular Exchange server. The new agent will then be installed on the computer specified by the administrator and appropriate registry settings will be created. The final step in adding a new agent involves updating configuration information used by router 156. It will be apparent to those skilled in the art that a more conventional scheme of administering Enterprise server 152 through the network and/or Exchange administration arrangements, although less practical, is also possible.

In system 150, a central system administration scheme is preferred. Since each agent (154a, 154b, 154c) and router 156 have address, user and configuration information associated therewith, and furthermore require access to such information for other system components, a single store for all administration information is particularly desirable. User information database 172 is the primary store for all administration and configuration information, including user administration information as described above, agent information, router information and wireless gateway information. User information database 172 is normally accessible to all Enterprise server components through the Enterprise server administration 158 and appropriate client interfaces. Although only one such administration client interface 176 is shown in FIG. 5, all components requiring access to user information database 172 must communicate with Enterprise server administration 158. As will be apparent, the administration interfaces may also be implemented as clients to one or more services of Enterprise server administration 158.

This central user information storage arrangement is in contrast with systems 50 and 80, in which administration information is preferably stored on the Exchange servers. In order to provide some measure of backup however, additional data stores may be provided for each agent 154a, 154b and 154c and/or router 156. One such separate store for router 156 is device/agent lookup table 170. If for any reason router 156 cannot access the user information database 172 through server administration 158, then it will access lookup table 170 to determine to which agent a message received from a mobile device 20 should be forwarded. Similarly, in time periods during which user information database 172 is inaccessible, router 156 could extract device and agent information from outgoing redirected messages and update lookup table 170 accordingly in order to ensure that lookup table 170 is as accurate as possible.

Although the architecture of systems 80 and 150 are different, overall operation of system 150 is substantially the same as described above for system 80. When a user has been properly added to the Enterprise server 152, message notifications from the Exchange servers are processed to determine whether or not a message is to be redirected. Any appropriate message filter rules are applied and when the message is to be redirected to a wireless device, the message is sent by the corresponding agent to router 156 for storage in message store 168 and transmission to the appropriate wireless device 20 through the wireless gateway 32.

Thus, the alternative architecture of FIG. 5 offers several advantages over the architecture of FIG. 3. First, the ability to have both Exchange server and agent on a single computer decreases the likelihood that traditional messaging failures will occur, as intra-computer communication instead of network communication can be used for messaging sessions. Distribution of various Enterprise server functions also allows several messaging sessions to be multiplexed efficiently into a single wireless gateway protocol session. A significant result of this multiplexing is that if a traditional messaging session hangs at a particular agent, the gateway session at the router can continue for all other agents, such that the multiplexed session has effectively been made tolerant to faults in traditional messaging. Even though the optimal agent, at a single computer, is unlikely to fail, the multiplexing is an additional safeguard for traditional messaging servers, which are not hosted on the agent computer.

The distributed architecture of system 150 further addresses the problem of scalability inherent in system 80. The addition of an Exchange server to system 150 requires deployment of only a single component of Enterprise server 152, namely an agent. Ideally, the new agent is integrated with the Exchange server on the same computer.

The redirection systems described above are adapted to operate in conjunction with messaging systems using Microsoft Exchange. However, redirection systems in accordance with the invention are not limited to such messaging systems. A further embodiment of the invention, as described below, provides a network server level redirection arrangement generally similar to those described above, but adapted for operation with Lotus® Domino™ servers.

Referring now to FIG. 6 a block diagram of a third Enterprise server system is shown generally as 200. As will be apparent, the overall structure of system 200 is very similar to system 50 (FIG. 2), the differences being that Exchange servers 54a, 54b and 54c have been replaced by a single domino server 204 and that MAPI clients 56a, 56b and 56c have been replaced by a single RPC client 206.

In system 200, network messaging functions in network 26 are provided using a Lotus Domino server 204. A client, such as Lotus Notes for example, enables users (not shown) in network 26 to access their E-mail messages, calendar records, tasks and the like from Domino server 204. Such user clients typically interface with Domino server 204 through a Domino Remote Procedure Call ("RPC") scheme. Unlike Exchange servers 54a, 54b, and 54c Domino server 204 supports not only messaging or primarily E-mail clients but also other types of clients, including browser clients for example, through RPC.

In an RPC scheme, an RPC client sends a procedure call to an RPC service. The RPC service then executes the procedure and if necessary returns a result to the RPC client. In system 200, an RPC client 206 on Enterprise server 52 sends procedure calls to Domino server 204, which then performs the called procedures. One such procedure call would be the polling signal, in response to which Domino server 204 returns information relating to polled user mailboxes, as discussed in further detail below.

As shown in FIG. 6, Enterprise server 202 includes an RPC client 206 as an interface between Enterprise server 202 and Domino server 204. Through RPC client 206, Enterprise server 202 accesses information stored on Domino server 204, thereby enabling redirection of selected information, such as a user's E-mail messages, from Domino server 204 to the user's wireless device 20. It will be apparent to those skilled in the art that network 26 may include multiple Domino servers (not shown) in addition to Domino server 204. In such systems, either multiple Enterprise servers are installed to share message redirection load, or multiple RPC clients are implemented in a single Enterprise server 202. Each Enterprise server in a multiple Enterprise server installation would preferably be configured to manage messaging traffic for a distinct group of users, normally all users on a single associated Domino server. However, the implementation of multiple RPC clients in each of the Enterprise servers, allowing any Enterprise server to communicate with any Domino server in the network, would provide for more balanced and dynamic load sharing. The operation of system 200 will be described below for a single Domino server 204. Operation of a multiple Domino server and multiple Enterprise server system will be apparent therefrom.

Unlike the Exchange server redirection systems described above, Enterprise server 202 does not rely on mailbox change notifications from Domino server 204. Instead, Enterprise server 202 preferably polls Domino server 204 for new E-mail messages or other data items for redirection. A polling interval or amount of time between consecutive polls of Domino server 204 by Enterprise server 202 is preferably configured when a user is added to Enterprise server 202, which effectively enables the user for wireless redirection of information. Although the polling interval is configurable to suit the particular network 26 in which Domino server 204 is operating, experimentation has shown a reasonable polling interval to be twenty seconds. Setting a shorter polling interval potentially provides for a shorter latency time between the arrival of a new message at Domino server 204 and its detection by Enterprise server 202, which thereby provides for shorter delay between the arrival of the message and its redirection to a mobile device 20. However, a shorter polling interval requires more frequent polling and response signaling between Domino server 204 and Enterprise server 202 and increases the time and processing resources that Domino server 204 must dedicate to polling related functions. Those skilled in the art will appreciate that higher network traffic may cause further signaling problems on network 26. Also, since a Domino server may support many additional messaging and non-messaging functions, the increased time and resource allocations for short-interval polling may be further undesirable. A longer polling interval reduces the amount of signaling and related Domino server processing, but may increase the delay between message arrival at Domino server 204 and redirection of the message by Enterprise server 202 to a mobile device 20. Selection of a polling interval thereby involves a trade-off between signaling and processing constraints and responsiveness or latency between message arrival and redirection.

Different polling intervals may be set for specific users or a single polling interval may be set for all users on an Enterprise server 202. A combined polling interval scheme may also be used, in which particular users or a groups of users, network administrators for example, are configured for shorter polling intervals, whereas a longer polling interval is set for other users. Such a multiple-interval scheme provides flexibility within a single installation, effectively allowing different redirection service levels. Users requiring substantially real-time message redirection could be assigned a shorter polling interval instead of a normal or default polling interval.

Enterprise server 202 is preferably integrated with Domino server 204 and in such a system would therefore be operating within network 26. Domino server 204 is normally implemented as a network function or service, running as a network service in Windows NT for example. As will be apparent to those skilled in the art however, Domino servers such as server 204 may instead be implemented on other platforms. Regardless of the network platform upon which Domino server 204 is running, the interfaces between desktop computers (not shown) in network 26 and Enterprise server 202 with Domino server 204 may be implemented with substantially the same RPC clients. As such, redirection system components at both desktop computers and Enterprise server 202 are platform independent.

Enterprise server 202, through its RPC client 206, polls Domino server 204 to check for new messages in all mailboxes which have been enabled for wireless message redirection. The timing of such polling is determined by the polling interval as discussed above. A single polling signal may request Domino server mailbox information for all users currently existing on Enterprise server 202. Alternatively, a distinct polling signal may be used to poll a mailbox for each user on Enterprise server 202, such that Enterprise server 202 sends a polling signal to Domino server 204 for each user in an Enterprise server user list. Enterprise server 202 and the polling signals it generates may instead be configurable to provide for polling of Domino server 204 for only certain groups of users for example.

In the interest of simplifying polling related processing at Domino server 204 and reducing network traffic by limiting the amount of information in a response signal, a selective polling scheme in which mailbox information is requested for only specific users, may also be used. In such a polling scheme, a user mailbox is polled or included in a polling signal only when redirection for the particular user is currently active. Since normal Enterprise server 202 operations require that Enterprise server 202 determine whether or not a message or information is to be redirected to a user's mobile device 20, the selective polling feature can be provided with little or no additional processing by Enterprise server 202. Alternatively, where Enterprise server 202 is integrated with Domino server 204, a determination of whether or not redirection is currently active for a particular user, or analogously for which users redirection is currently active, may possibly be made by Domino server 204. In such systems, when Domino server 204 is polled by Enterprise server 202, Domino server 204 includes in its response signal information for all mailboxes for which redirection is currently active.

In network redirection systems for Lotus Domino messaging servers, Enterprise server 202 is preferably integrated with Domino server 204. It will be apparent to those skilled in the art that this integration may possibly be accomplished by implementing Enterprise server 202 as a task running on Domino server 204. Administration functions for Enterprise server 202 in such systems may then be integrated with Domino server administrative arrangements. When a user's existing mailbox is to be enabled for redirection, a Domino server administrator adds the user to Enterprise server 202 using an Enterprise server administration utility installed on a computer from which Domino server administration functions can be performed. For a new user, the Domino server administrator may add the user's mailbox on Domino server 204 and also add the user to Enterprise server 202.

As described above with regard to system 50 (FIG. 2) integrated Enterprise server 202/Domino server 204 administration also has the associated disadvantage that simply enabling an existing user's mailbox for wireless redirection of messages by adding the user to Enterprise server 202 requires intervention by either a Domino server administrator or an Enterprise server administrator with Domino server administration permission or privileges. Domino server administrators must therefore be familiar with both Domino server 204 and Enterprise server 202, or Enterprise server administrators must have full Domino server administration permissions. As such, either Domino server administrators' workloads are increased, or control of network administration functions must be relaxed. In many networks or organizations, neither of these options would be a desirable alternative.

Figure 7:
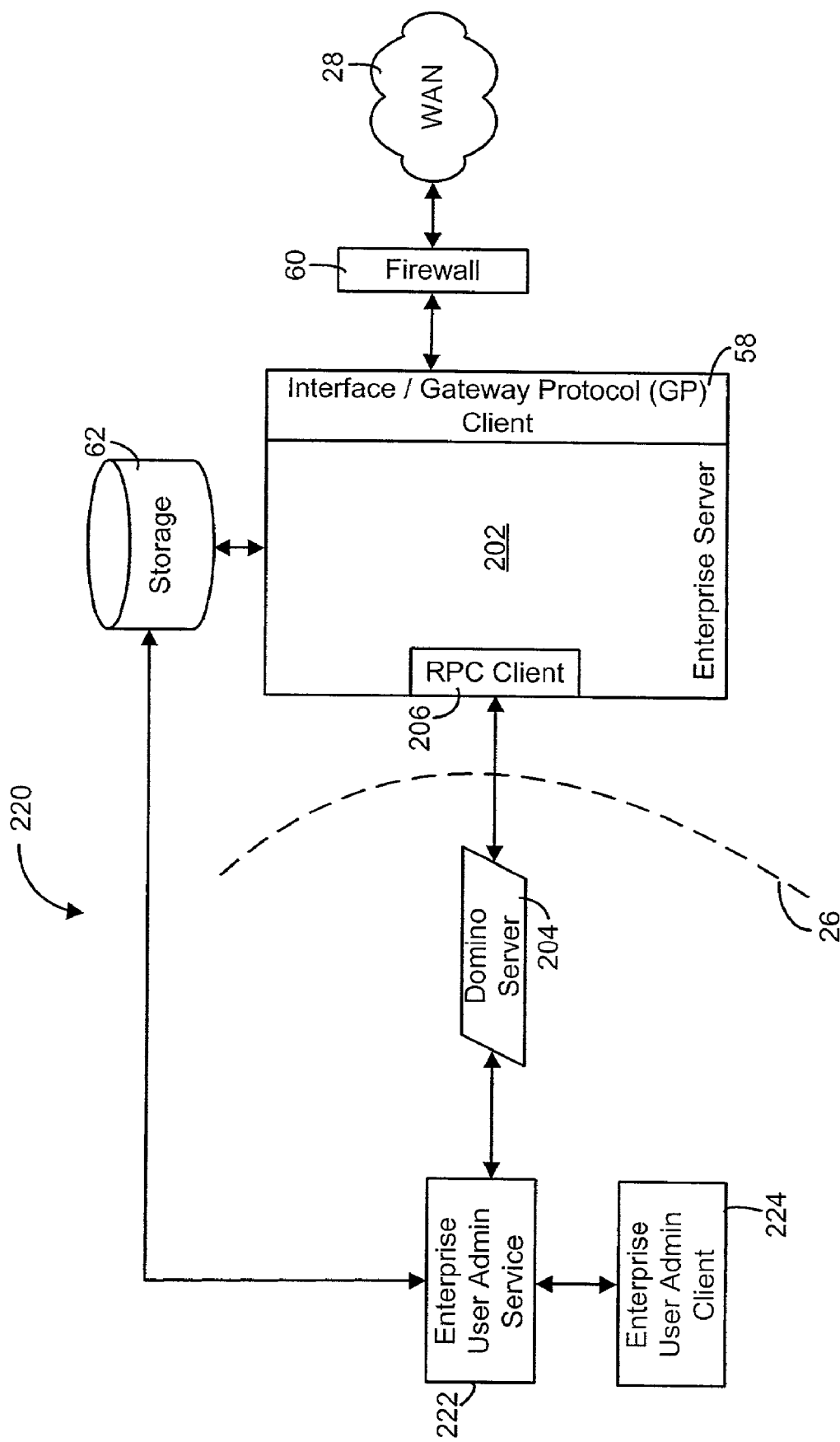
FIG. 7 is a block diagram of the system of FIG. 6 incorporating a user administration system.

Referring now to FIG. 7, a block diagram of the system of FIG. 6 incorporating a user administration system is shown generally as 220. System 220 is similar to system 80 of FIG. 3 and operates in the same manner. As with system 80, Enterprise user administration service 222 is preferably installed and executed in the background on Domino server 204 or on a computer which can communicate with the Domino server 204 and has Domino server administration rights. Enterprise user administration client 224 is similarly installed on a computer in network 26 and communicates with the service 222 to perform Enterprise server administration functions.

Enterprise server user administration through client 224 and service 222 proceeds substantially as described above for client 84 and service 82 of system 80 (FIG. 3), except that client 224 and service 222 are preferably implemented using RPC. Where more than one Domino server 204 is installed in the network, service 222 preferably communicates with and is able to administer all of the Domino servers.

Service 222 runs on a computer or under a network account having Domino server administration permissions, whereas client 224 may be installed on virtually any computer that can communicate with the computer on which service 222 is running. Administration functions are thus provided through client 224, which does not require Domino server administration privileges or permissions, even though the administration functions for Enterprise server 202 remain integrated with service 222. Service 222 performs the Enterprise server administration tasks requested by client 224 through Domino server administration arrangements.

As in system 80, system 220 provides for flexibility in assignment of Domino server administration rights to Enterprise server administrators. Service 222, like service 82, is preferably configured to provide for common Enterprise server administration functions such as adding users to an Enterprise server, deleting users from an Enterprise server, listing all users on an Enterprise server, and verifying that a particular user exists on a particular Enterprise server. Even though service 222 may have full Domino server administration rights, it may be configured to provide only specific Enterprise server administration functions to client 224. Service 222 may be provide any selected Enterprise server administration tasks through client 224 to avoid the necessity for intervention by Domino server administrators.

The Enterprise server administration functions described above with regard to FIG. 4 are also provided in the client-service arrangement in a Domino server messaging system and are accomplished substantially as described with regard to FIG. 4. The following description of Enterprise server user add, delete, list and verify functions in a Domino server system is therefore relatively brief and relates primarily to differences in Enterprise server user administration functions in Domino server systems as compared to Exchange server systems.

Referring back to FIG. 4, the overall processing involved in Enterprise server user administration for Domino server systems is as shown in FIG. 4. An existing Domino server mailbox is enabled for redirection to a wireless device 20 through an add user administration request by client 224 at step 92. Before a new user may be added on Enterprise server 202, a mailbox for the new user must first be added to Domino server 204. In response to the add user request from client 224, service 222 creates a user information record at step 104 either on Domino server 204 or in data store 62 associated with Enterprise server 202, including user information such as a user name, a mailbox name and a wireless device identifier. Multiple-user administration with a single client request is also supported in Domino server systems.

A delete user administration function at step 94 proceeds substantially as described above, to delete or overwrite a user information record at step 112 to thereby effectively disable one or more Domino server mailboxes with respect to wireless redirection.

Enterprise server list users function at step 96 and verify users at step 98 are also performed by the Domino server system client 224 and service 222 as described above, except that the user records that are accessed are stored on either Domino server 204 or Enterprise server data store 62.

The add user, delete user, list users and verify user administration functions are common Enterprise server administration functions which are likely be executed relatively frequently and therefore should be performed through a client 224 and service 222. However, these particular functions are for illustrative purposes only; the invention is not limited thereto. Further or different Enterprise server user administration functions could be performed through a client-service arrangement, as indicated generally at steps 100 and 134.

In another implementation, system 220 may be reconfigured to mirror that of system 150 (FIG. 5) to overcome the same problems addressed by system 150. In this case, Exchange servers 54*a*, 54*b* and 54*c* would be replaced by Domino servers and MAPI clients 160*a*, 160*b* and 160*c* in Enterprise server agents 154*a*, 154*b* and 154*c* would be replaced by RPC clients. Internal protocols, including for example the router protocol, administration protocol and gateway protocol, are preferably substantially the same for Enterprise servers operating in conjunction with Exchange servers and Domino servers. Overall operations of a distributed Enterprise server implemented with one or more Domino servers is also substantially the same as described above for the Exchange server-based system 150 and thus will be readily understood by those skilled in the art to which the present invention pertains.

The versatility of Enterprise server systems in accordance with the instant invention will be particularly apparent from the ability to simply adapt an agent (154*a*, 154*b*, 154*c*) of system 150 (see FIG. 5) to communicate with the particular messaging system in network 26. Agent operations and all other agent interfaces are common for all messaging systems. Inter-agent communication interfaces, agent to router interfaces (preferably BRP, as described above) and agent to administration interfaces are preferably independent of the network messaging system. The user administration is also substantially independent of the messaging system, except for its interface with the messaging servers and perhaps administration command and information formats. At Router 156, communications with the agents preferably use BRP, communications with the user administration is preferably messaging system independent except with respect to information formats for example, and the gateway protocol will also be independent of the network messaging system. It will therefore be apparent that the basic Enterprise server system including agents, a user administration and a router can therefore be adapted to provide data item or message redirection for networks using messaging systems other than Microsoft Exchange and Lotus Domino.

Redirection functionality may be provided not only for messages in a network, but also for other data items, including but not limited to tasks or task lists, calendar events such as appointments and appointment requests, address book or contact information and similar data items relating to common messaging system features. Particularly in networks using Domino servers, many non-messaging data items could also be redirected. As those skilled in the art will appreciate, messaging is but one feature supported by Domino servers. Any documents, databases, information downloaded by Domino server browser clients and the like may also be redirected to a user's wireless device 20.

In addition, the use of common internal Enterprise server system protocols facilitates migration of Enterprise server features for any particular network messaging system or platform to any other network messaging system or platform.

Although the invention has been described with reference to certain specific embodiments, various modifications thereof will be apparent to those skilled in the art without departing from the spirit and scope of the invention as outlined in the claims appended hereto.

What is claimed as the invention is:

1. A system for administrating a wireless communication network, comprising:
   a messaging server configured to send and receive electronic messages over a computer network;
   an enterprise server configured to direct electronic messages between the messaging server and a plurality of mobile devices over the wireless communication network;
   the enterprise server being configurable via the messaging server using messaging server administration functions;
   an enterprise user administration service program configured to execute on a computing device and communicate with the messaging server, the enterprise user administration service program having administration rights to the messaging server;
   a user administration client configured to communicate with the enterprise user administration service program to administer the enterprise server; and
   the enterprise user administration service program serving as an interface between the user administration client and the messaging server, enabling the user administration client to perform one or more messaging server administration functions to configure the enterprise server.

2. The system of claim 1, wherein the enterprise user administration service program provides the user administration client access to a limited set of messaging server administration functions.

3. The system of claim 1, wherein the user administration client does not require administration rights to the messaging server independent of the administration rights of the enterprise user administration service program.

4. The system of claim 2, wherein the administration rights of the enterprise user administration service program enable a full set of messaging server administration functions, and wherein the enterprise user administration service program restricts the user administration client to the limited set of messaging server administrations functions.

5. The system of claim 1, wherein the enterprise user administration service program executes on the messaging server.

6. The system of claim 1, wherein the enterprise user administration service program executes on a computer that is coupled via the computer network to the messaging server.

7. The system of claim 1, wherein the enterprise user administration service program provides the user administration client with one or more messaging server administration functions selected from a group consisting of adding a user to the enterprise server, deleting a user from the enterprise server, generating a list of enterprise server users, and verifying an enterprise server user.

8. The system of claim 1, wherein the enterprise user administration service program enables the user administration client to perform messaging server administration functions to configure the messaging server.

9. A user administration system for use with a messaging server and an enterprise server, the messaging server being configured to send and receive electronic messages over a computer network, the enterprise server being configured to direct electronic messages between the messaging server and a plurality of mobile devices over a wireless communication network, wherein user administration functions for the enterprise server are performed via the messaging server using messaging server administration functions, the user administration system comprising:
   an enterprise user administration service program configured to execute on a first computing device and communicate with the messaging server, the enterprise user administration service program being configurable to have administration rights to the messaging server;
   a user administration client program configured to execute on a second computing device and communicate over a computer network with the enterprise user administration service program to administer the enterprise server; and
   wherein the enterprise user administration service program, when executed on the first computing device, is operable to serve as an interface between the user administration client program and the messaging server to enable the user administration client program to perform one or more messaging server administration functions to configure the enterprise server.

10. The system of claim 9, wherein the enterprise user administration service program provides the user administration client program access to a limited set of messaging server administration functions.

11. The system of claim 9, wherein the user administration client program does not require administration rights to the messaging server independent of the administration rights of the enterprise user administration service program.

12. The system of claim 9, wherein the administration rights of the enterprise user administration service program enable a full set of messaging server administration functions, and wherein the enterprise user administration service program restricts the user administration client program to the limited set of messaging server administrations functions.

13. The system of claim 9, wherein the first computing device is the messaging server.

14. The system of claim 9, wherein the enterprise user administration service program executes on a computer that is coupled the computer network to the messaging server.

15. The system of claim 9, wherein the enterprise user administration service program provides the user administration client program with one or more messaging server administration functions selected from a group consisting of adding a user to the enterprise server, deleting a user from the enterprise server, generating a list of enterprise server users, and verifying an enterprise server user.

16. The system of claim 9, wherein the enterprise user administration service program enables the user administration client program to perform messaging server administration functions to configure the messaging server.

17. A method for administering an enterprise server, the enterprise server being configured to direct electronic messages between a messaging server and a plurality of mobile devices over a wireless communication network, wherein user administration functions for the enterprise server are performed via the messaging server using messaging server administration functions, the method comprising:

configuring administration rights to the messaging server;

receiving a user administration request for the enterprise server from a user administration client, the user administration request specifying one or more messaging server administration functions; and submitting the user administration request to the messaging server to perform one or more user administration functions to the enterprise server;

wherein the user administration client does not have administration rights to the messaging server.

18. The method of claim 17, wherein the messaging server is provided a limited set of administration rights to the messaging server.

19. The method of claim 17, further comprising:

receiving a second user administration request for the messaging server from the user administration client; and submitting the second user administration request to the messaging server to perform one or more user administration to the messaging server.

* * * * *